(12) United States Patent
Roth et al.

(10) Patent No.: US 11,847,605 B2
(45) Date of Patent: *Dec. 19, 2023

(54) DISCHARGING COURIER SERVICE ASSIGNMENTS

(71) Applicant: Fovea2 LLC, San Francisco, CA (US)

(72) Inventors: Issac Jacob Roth, San Francisco, CA (US); Theobolt N. Leung, San Francisco, CA (US); William Jessup Taylor, San Francisco, CA (US)

(73) Assignee: Fovea2 LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,669

(22) Filed: Jun. 6, 2022

(65) Prior Publication Data

US 2022/0405702 A1   Dec. 22, 2022

Related U.S. Application Data

(63) Continuation of application No. 17/349,560, filed on Jun. 16, 2021, now Pat. No. 11,367,038.

(51) Int. Cl.
| | |
|---|---|
| *G06K 15/00* | (2006.01) |
| *G06Q 10/0832* | (2023.01) |
| *G06Q 30/018* | (2023.01) |
| *G06Q 10/083* | (2023.01) |
| *G06K 7/14* | (2006.01) |
| *G06F 3/04847* | (2022.01) |
| *G06K 7/10* | (2006.01) |
| *G06F 3/0482* | (2013.01) |

(52) U.S. Cl.
CPC ..... *G06Q 10/0832* (2013.01); *G06Q 10/0838* (2013.01); *G06Q 30/0185* (2013.01); *G06F 3/0482* (2013.01); *G06F 3/04847* (2013.01); *G06K 7/10861* (2013.01); *G06K 7/1413* (2013.01); *G06K 7/1417* (2013.01); *G06K 2007/10504* (2013.01)

(58) Field of Classification Search
CPC ........... G06Q 10/0832; G06Q 10/0833; G06Q 10/083; G16H 40/20; G05D 1/0088
USPC .................................. 705/318; 235/383, 385
See application file for complete search history.

(56) References Cited

U.S. PATENT DOCUMENTS

| | | | |
|---|---|---|---|
| 11,367,038 B1 * | 6/2022 | Roth | G06Q 30/0185 |
| 2017/0201571 A1 * | 7/2017 | Sherf | H04L 67/1029 |
| 2019/0130260 A1 * | 5/2019 | Han | G06Q 10/0838 |
| 2019/0130354 A1 * | 5/2019 | Han | G06Q 10/08355 |

(Continued)

*Primary Examiner* — Daniel St Cyr
(74) *Attorney, Agent, or Firm* — Seed IP Law Group LLP

(57) ABSTRACT

A data structure representing the state of courier assignments is described. For each courier assignment, the data structure contains: information identifying a destination location for the courier assignment; information identifying a drop-off protocol specified for the courier assignment, the drop-off protocol specifying a sequence of steps; and, for each of at least some of the steps of the identified drop-off protocol, a representation of compliance evidence collected with respect to the step of the courier assignment. The contents of the data structure are usable to present collected compliance evidence for steps of the drop-off protocol specified for courier assignments among the plurality of courier assignments, either contemporaneously or at later times.

22 Claims, 31 Drawing Sheets

(56) References Cited

U.S. PATENT DOCUMENTS

2021/0125140 A1\* 4/2021 Kim .................. G06Q 10/0838
2021/0142276 A1\* 5/2021 Gupte ................ G06K 7/10861

\* cited by examiner

Order Form

Andrew Martin — 1211
Requestor

Invoice 673241 — 1212
Invoice Reference or Patient Name

| Pickup Location | Destination Location |
|---|---|
| FORT SUTTER SURGERY CNTR — 1221 | DPMG — 1241 |
| Location Name | Location Name |
| 12 ALABAMA ST. — 1222 / #525 — 1223 | 3301 C STREET — 1242 / #200 E — 1243 |
| Address / Room | Address / Room |
| SACRAMENTO — 1224 / CA — 1225 / 95816 — 1226 | SACRAMENTO — 1244 / CA — 1245 / 95816 — 1246 |
| City / State / Zip Code | City / State / Zip Code |
| Jane Doe — 1227 | desk agent — 1247 |
| Pickup Contact | Destination Contact |
| 123 456 7890 — 1228 | 462 910 7110 — 1248 |
| Contact Number | Contact Number |
| Please write any notes you may have here — 1229 | Please write any notes you may have here — 1249 |
| Notes | Notes |
| Wed Jan 06 2021 — 1231 / 9:30 AM — 1232 | Wed Jan 06 2021 — 1251 / 5:30 PM — 1252 |
| Pickup Date / Pickup Time | Dropoff Date / Dropoff Time |
| Pack Frozen Specimen — 1235 | SFO Cargo Dropoff — 1255 |
| Protocol | Protocol |

DISCHARGING COURIER SERVICE ASSIGNMENTS

CROSS-REFERENCE TO RELATED APPLICATION

This application is a continuation application of U.S. patent application Ser. No. 17/349,560, filed Jun. 16, 2021, which is hereby incorporated herein by reference in its entirety.

BACKGROUND

Courier services transport physical objects, picking them up at an originating location and delivering them to a destination location.

Many courier service assignments involve particular processes or other requirements. These can relate to how to enter or depart the originating and destination locations; how to retrieve or deliver the object; and how to pack, label or unpack it for transport or delivery, as examples.

It is typical for a courier service to provide courier agents with instructions printed on paper about how to complete assignments. In some cases, information about how to complete certain categories of assignments—such as those for a certain sender or receiver of objects—is passed verbally to couriers from dispatchers, supervisors, more experienced couriers, etc.

BRIEF DESCRIPTION OF THE DRAWINGS

FIG. 12 is a display diagram showing sample contents of a display presented by the facility in some embodiments to permit a customer to place a courier order directly, such as by filling out and posting a web form served by the server.

DETAILED DESCRIPTION

Figure 1:
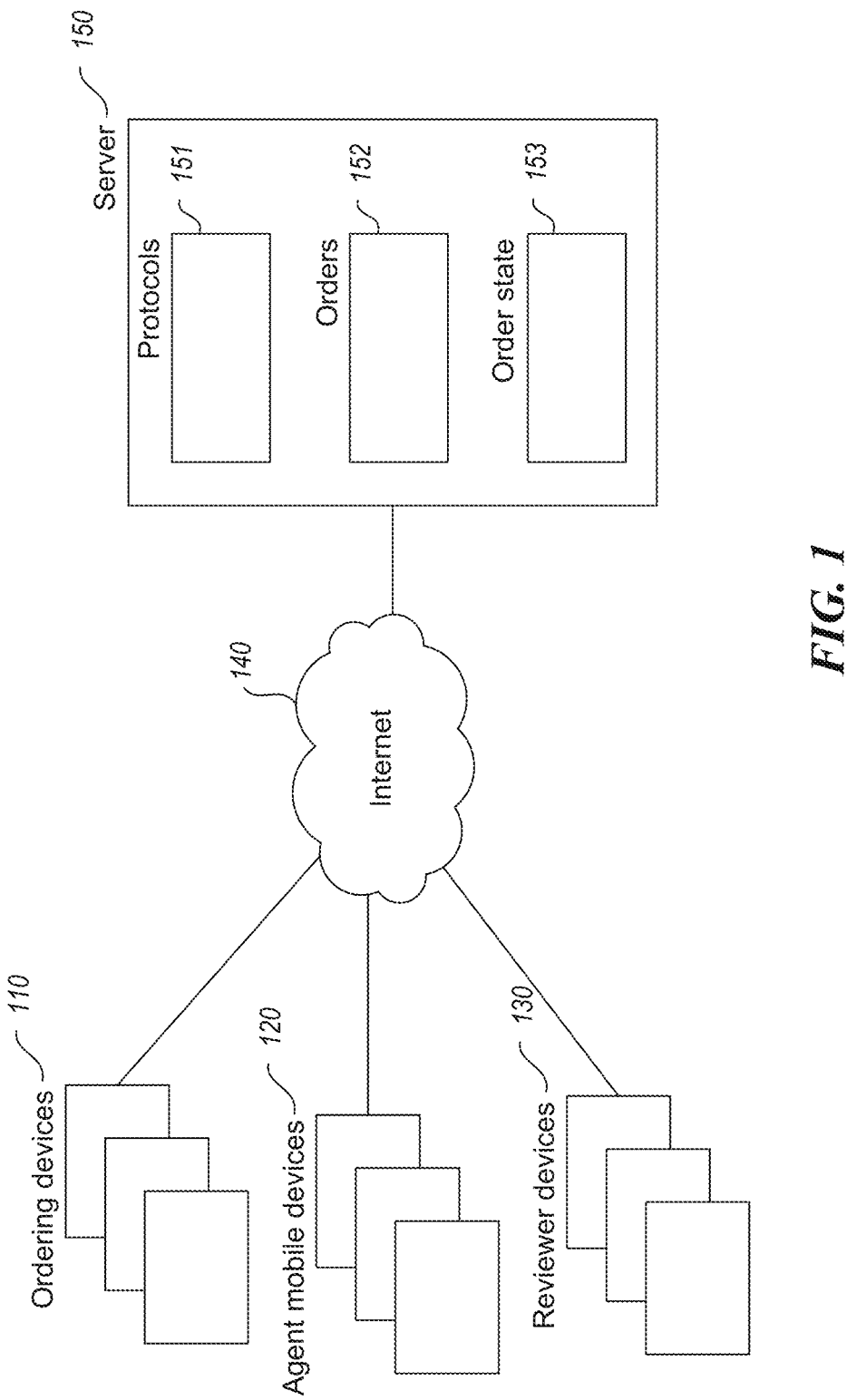
FIG. 1 is a network diagram showing an environment in which the facility operates.

The inventors have recognized significant disadvantages of conventional approaches to managing performance of a courier service assignment. First, they have found existing techniques for instructing a courier agent about the requirements for a courier assignment to be inefficient and error-prone. Also, recording instructions on paper often makes it difficult or impossible to alter them later, particularly after the courier agent has begun their activity for the day.

Second, conventional processes provide little insight about the details of how a courier assignment was performed to customers, dispatchers, supervisors, etc. Further, most such insight is received after the courier assignment is completed, such as when a person at the destination location unpacks and inspects a transported object. This general lack of real-time visibility into an assignment in progress prevents these involved parties ("reviewers") from intervening into an assignment in progress to assist the courier agent to correct mistakes or adapt to unanticipated conditions. This can result in failure to meet an assignment's requirements, or even failure to complete it in any manner.

Third, any persistent records conventionally created about completed assignments typically contain few details about how the assignment was completed; it is common to make a record of only pickup and delivery times for an assignment.

In response to recognizing these disadvantages, the inventors have conceived and reduced to practice a hardware and/or software facility for discharging courier service assignments ("the facility"). In some embodiments, the facility provides a distributed application that facilitates the specification of assignment details by or on behalf of the customer, in some cases based on revisable customer-specified or customer-adapted protocols; provides visual instructions to the courier agent in a manner synchronized with the agent's performance of different stages of the assignment, which include directions to collect particular pieces of evidence showing compliance with requirements of the assignment; makes status of multiple assignments and associated compliance evidence available to reviewers in real-time and persistently; and facilitates communication between agents and reviewers to help the agents complete their assignments successfully.

In some embodiments, the facility is adapted for use on behalf of medical couriers who convey items needed to assist one or more patients. Typical examples of such items are biological samples or specimens; biological substances, such as blood, plasma, or bone marrow; organs; vaccines and medicines; and/or medical devices or supplies. It is common to convey such items between hospitals and other patient treatment settings and medical laboratories, manufacturers, suppliers, etc. For example, a urine sample may be transported by a courier agent from a clinic where it is collected to a lab where it is analyzed, while vaccine supplies may be transported from a manufacturer or distributor of the vaccine to vaccination clinics where it will be administered. It is common for items transported by medical courier to require specialized forms of handling, such as temperature control, stabilization against shock, particular spatial orientation, high-efficacy modes of sealing, etc. Medical couriers are also often required to collect and maintain chain-of-custody evidence detailing how and from whom the courier agent received an item at pickup, and how a particular authorized person received and accepted responsibility for the item on dropoff.

In some embodiments, the facility performs interleaving of multiple protocols. As one example, where multiple protocols specified among a courier agent's orders specify prerequisite equipment (e.g., order A requires a cooler, order B requires a cooler and dry ice, and order C requires a biohazard sticker to be used on a packing box), the facility merges these required materials into a single readiness checklist for the courier agent. As another example, where two tasks are at the same location, the facility shows the steps related to the location only once (for example, park in a certain location, enter a certain door, find a certain refrigerator), which are followed by the unique portions of the protocol specified by the first order, then the unique steps of the protocol specified for the second order.

In some embodiments, the facility permits instructions given to a courier agent and protocols on which they are based to be adjusted at any time, including after a courier has begun their activities for the day, or even after they have begun a task that is altered. Further, in some embodiments, the facility permits orders and tasks to be dynamically reassigned to other courier agents. The facility also permits the practice of reassigning courier agents to be practiced more widely, because the detailed instructions it gives permits a larger percentage of courier agents to be qualified to perform an order or task, as contrasted with reassigning an order or task among only those courier agents that have undergone formal training for it.

In some embodiments, the facility operates in conjunction with a third-party courier dispatch software product. In such embodiments, the facility defines courier protocols, and provides information about them to the dispatch software. The dispatch software creates orders each specifying one or more of the protocols. The dispatch software manages the orders and tasks assigned to each courier agent, and calls on the facility to guide the courier agent's performance of his or her tasks. This modular approach permits the facility to be used in connection with an unlimited number of third-party dispatch software products, which in some cases in turn permits the facility to be used with any delivery network, including both its infrastructure and its staff.

In service of this division of labor, in various embodiments, the facility, the third-party courier dispatch software product, or both provide an API or other programmatic interface that perform one or more of the following: (1) pass from the facility to the dispatch software the set of protocols defined by the facility, in some cases filtered to those used by or accessible to a particular customer, together with an identifier for each of these protocols uniquely identifying the corresponding protocol, or causing the facility to display this information on behalf of the dispatch software; (2) passing detailed information about a particular courier protocol from the facility to the dispatch software, or causing the facility to display this information on behalf of the dispatch software; (3) permitting the dispatch software to pass the facility the identifier of a protocol specified for a particular order or task in order to initiate the facility's process of guiding the assigned courier agent through performance of this protocol; etc.

By performing in some or all of the ways discussed above, the facility can meaningfully improve courier service assignments' efficiency, level of success, and auditability.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by directing the agent to capture compliance evidence of particular types at the points at which it is needed, the facility conserves the additional storage and processing resources that would be required to capture compliance evidence continuously, such as being able to capture still images at the appropriate points in time rather than a video covering a larger span of time. This permits less expensive devices having less storage or processing capacity to be used, or allows the same device to devote greater storage or processing capacity to other tasks.

FIG. 1 is a network diagram showing an environment in which the facility operates in some embodiments. One or more servers 150 store the following: protocol definitions 151 that, for each of a number of protocols, specify a set of steps making up the protocol; these protocol definitions may be created by customers, members of the courier organization, people involved in the operation of a facility, etc.; one or more courier orders 152, each specifying such information as pickup location and time, dropoff location and time, and pickup and dropoff protocols; and order state information 153 including, for each order among the orders, data about the extent to which it has been completed, compliance evidence, messages exchanged about the order, etc. The server is connected via the internet or another network 140 to a variety of devices: ordering devices 110 that interact with the server in order to create or revise orders; these ordering devices may be used by customers; employees of the courier service communicating with customers by a communication modality such as voice call, video conference, text message, email message, etc.; agent mobile devices 120, such as smart phones or tablets, that are carried by the courier agents and receive information from the server about orders and communications that relate to them, and transmit information to the server about performance of orders and communication about them; and reviewer devices 130 that are used by reviewers such as the customer, employees of the courier service, or people involved in the operation of the facility to monitor the state of future, in-process, or past orders and communicate with others such as the courier about these orders.

Figure 2:
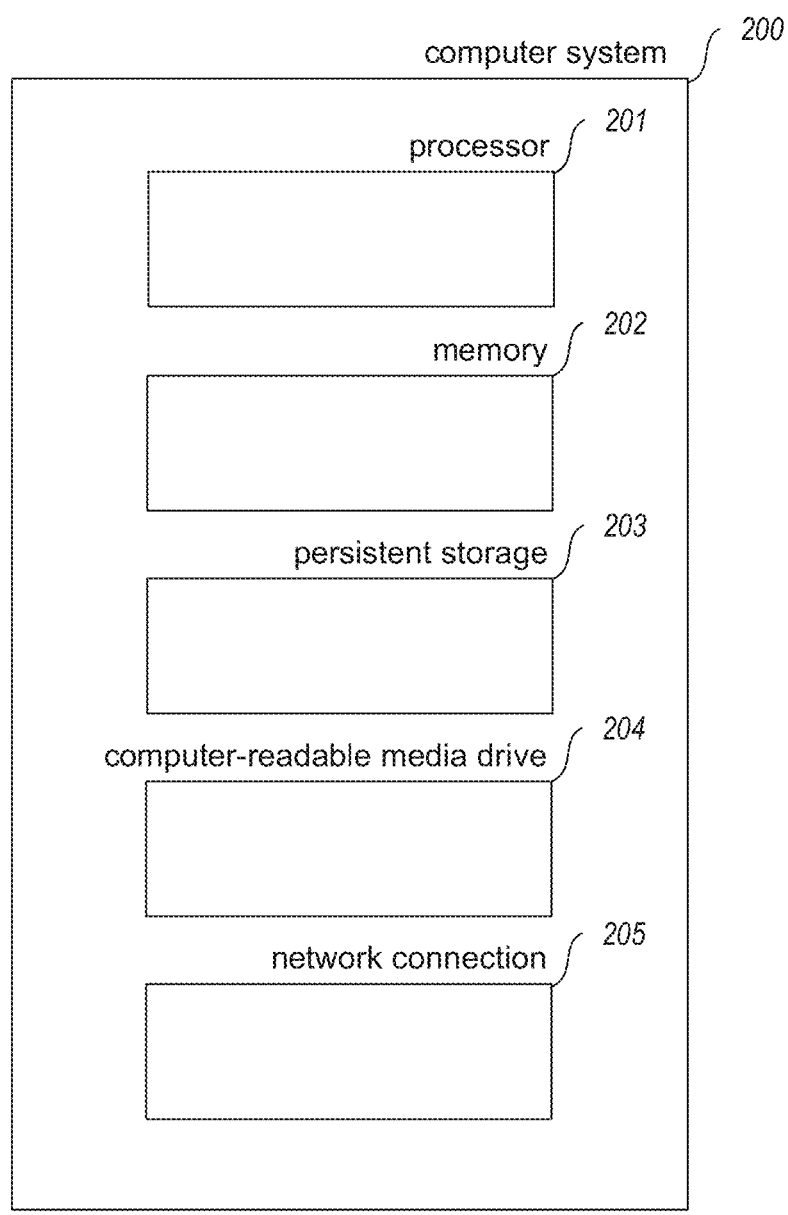
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
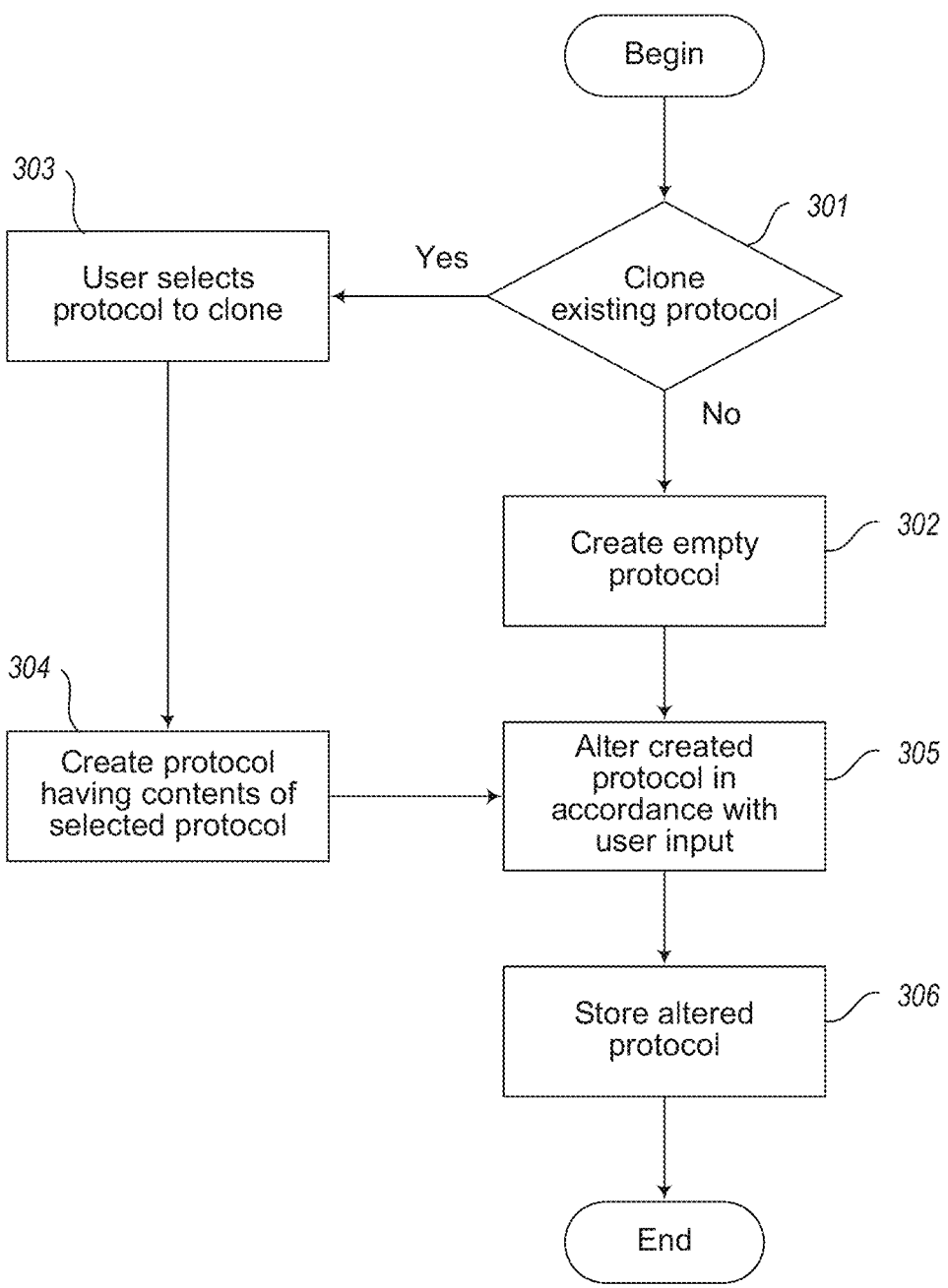
FIG. 3 is a flow diagram showing a process performed by the facility in some embodiments to create a courier protocol, such as a courier protocol specifying a pickup procedure or a dropoff procedure for an item.

FIG. 3 is a flow diagram showing a process performed by the facility in some embodiments to create a courier protocol, such as a courier protocol specifying a pickup procedure or a dropoff procedure for an item. In act 301, if the user choses to clone an existing protocol, then the facility continues in act 303, else the facility continues in act 302. In act 302, where the user has not chosen to clone an existing protocol, the facility creates an empty protocol for population by the user. After act 302, the facility continues in act 305.

In act 303, where the user has chosen to clone an existing protocol, the user selects a protocol to clone from a list displayed by the facility.

Figure 4:
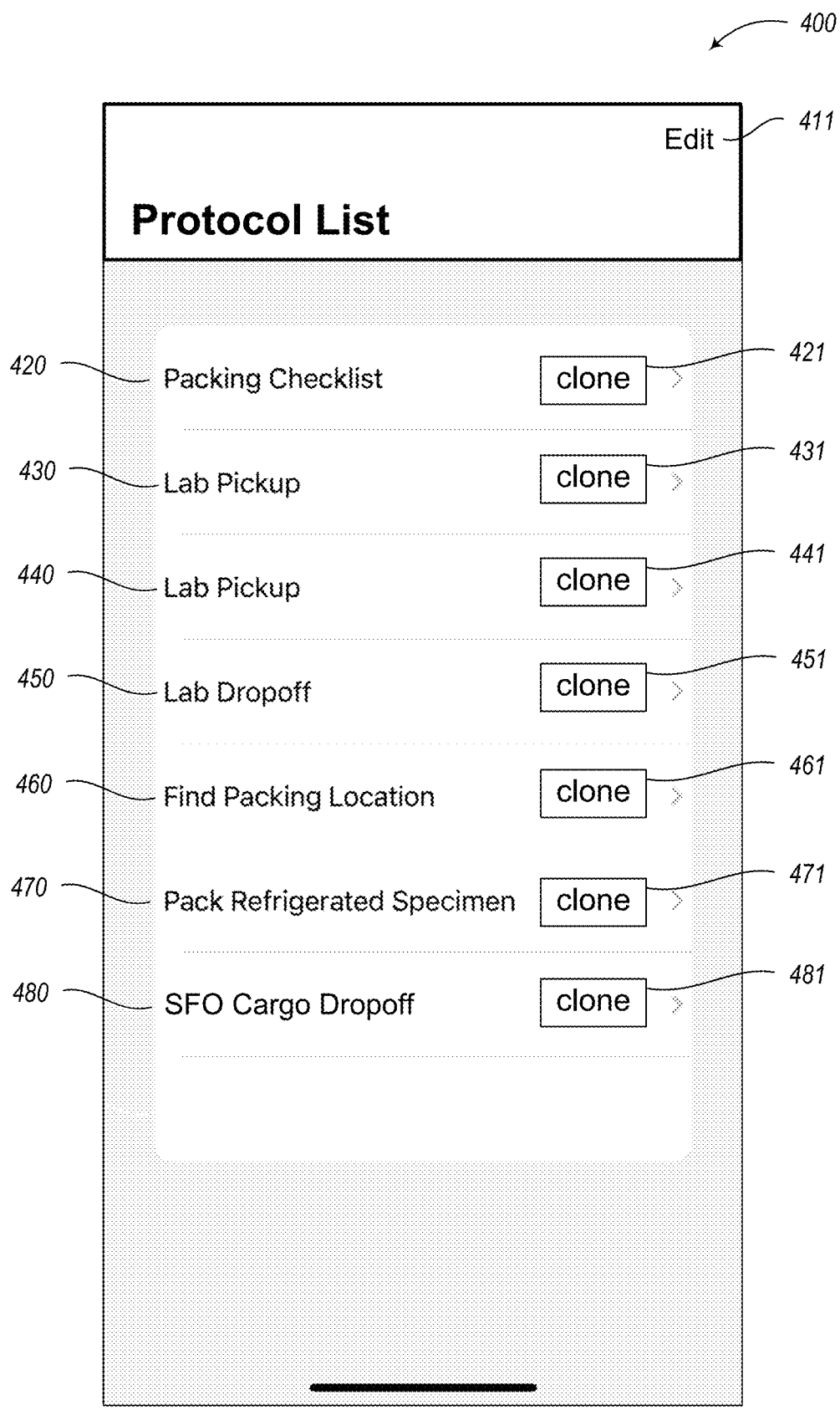
FIG. 4 is a display diagram showing sample contents of a display presented by the facility in some embodiments to present a list of existing protocols that are available to clone.

FIG. 4 is a display diagram showing sample contents of a display presented by the facility in some embodiments to present a list of existing protocols that are available to clone. The display 400 includes a list of existing protocols 420, 430, 440, 450, 460, 470, and 480. Each of these existing protocols is shown with a clone control 421, 431, 441, 451, 461, 471, and 481. To select a protocol to clone, the user taps, clicks, or otherwise activates a clone control for that protocol. For example, in order to clone the Pack Refrigerated Specimen protocol 470, the user activates control 471.

Those skilled in the art will appreciate that the display shown in FIG. 4 and in each of the display diagrams discussed below may be altered in a variety of ways. For example, the shown visual information may be rearranged, or its literal appearance may be changed; some of the shown visual information may be omitted, or other visual information may be included; the shown visual information may be reformatted or reoriented for a variety of device types and displays; etc.

Returning to FIG. 3, in act 304, the facility creates a new protocol having the contents of the protocol selected in act 303. In act 305, the facility alters the protocol created in act 302 or 304 in accordance with user input.

Figure 5:
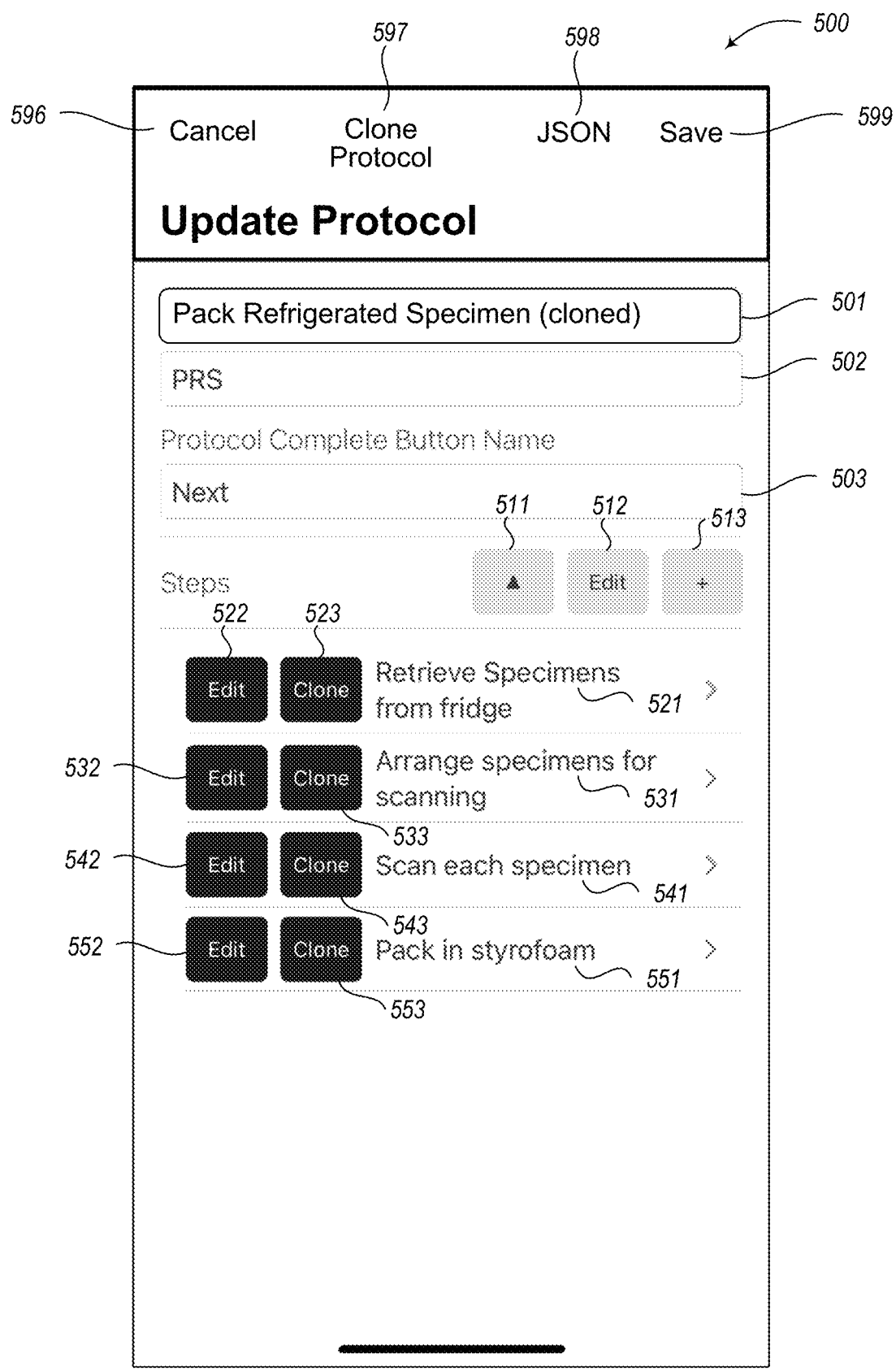
FIG. 5 is a display diagram showing sample contents of a display presented by the facility in some embodiments to permit alteration of a created protocol.

FIG. 5 is a display diagram showing sample contents of a display presented by the facility in some embodiments to permit alteration of a created protocol. In this case, the facility presents display 500 in response to the user's activation of control 471; the display enables alteration of a protocol cloned from the Pack Refrigerated Specimens protocol created in the example. The display shows the name 501 of the protocol, a shortened "nickname" of the protocol 502, a name 503 shown on a bottom that will complete the protocol, and present steps 521, 531, 541, and 551 of the protocol. Control 513 can be activated to add a step to the protocol. After one of the steps is selected, control 511 can be used to move it earlier in the order of the steps, and control 512 can be used to change details of a selected step. Also, each step has its own edit control (522, 532, 542, and 552, respectively) and its own clone control (523, 533, 543, and 553, respectively). In the example, the user activates edit control 552 to edit the Pack in styrofoam step 551.

Figure 6:
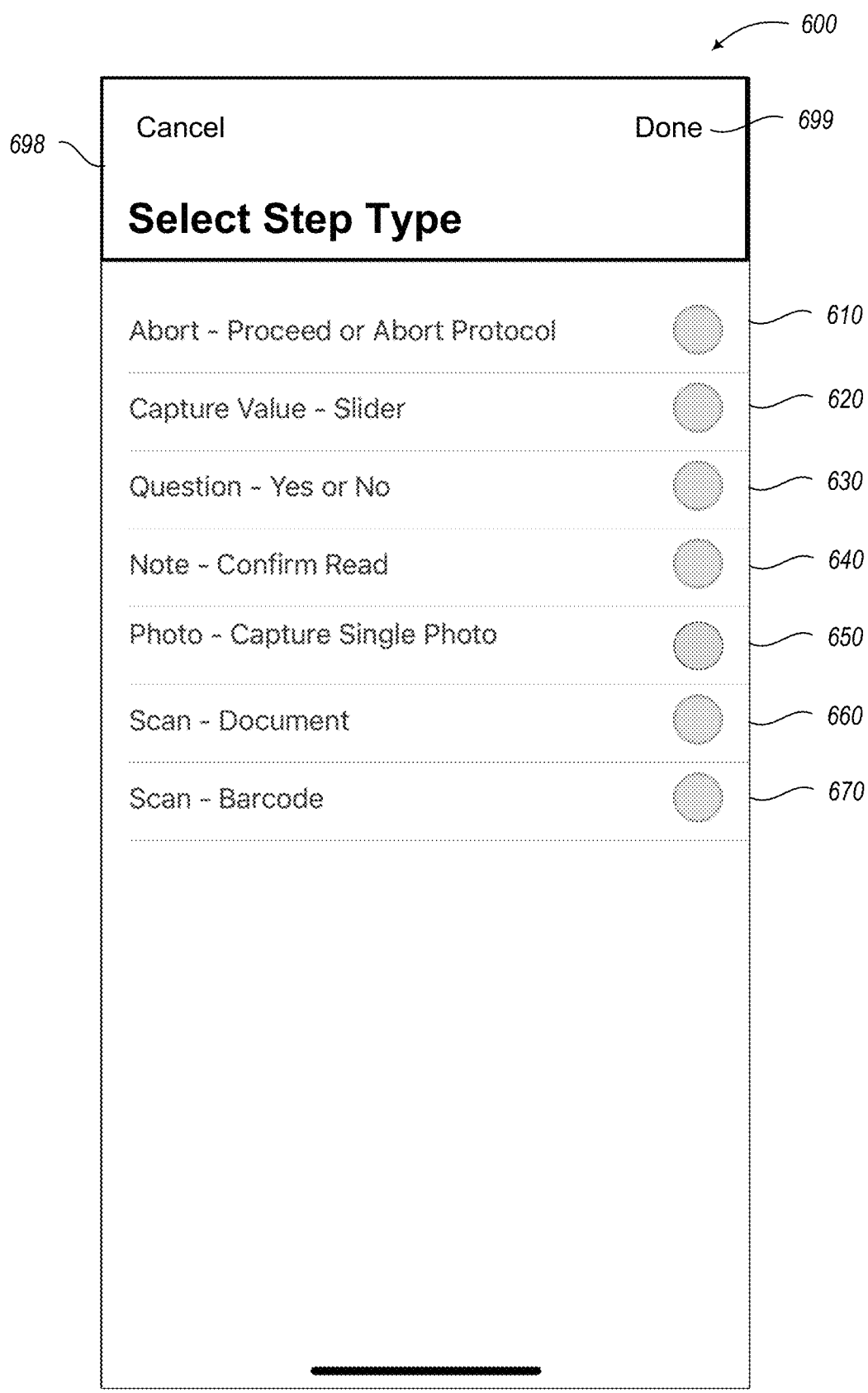
FIG. 6 is a display diagram showing sample contents of a display presented by the facility in order to select a new type for a new or edited step.

FIG. 6 is a display diagram showing sample contents of a display presented by the facility in order to select a new type for a new or edited step. The display 600 contains a list of step types 610, 620, 630, 640, 650, 660, and 670. Here, for example, the user can select the photo step type 650 in order to direct courier agents to capture a photo showing that they completed this step. In some embodiments (not shown), the facility enables the user to specify how frequently the specified compliance evidence must be captured by each courier as part of the protocol, such as every third time the courier agent completes the protocol, once a week, or randomly at some average frequency. In some embodiments, a global rule requires all courier agents to capture compliance evidence the first n times they perform a protocol, the first n days they are working as a courier agent, etc. In some embodiments, the facility requires compliance evidence when the courier agent has not collected it for a certain period of time, such as a week or a month. In some embodiments, certain compliance evidence is required in every performance of the protocol, such as barcode compliance evidence used in order tracking and accounting.

Figure 7:
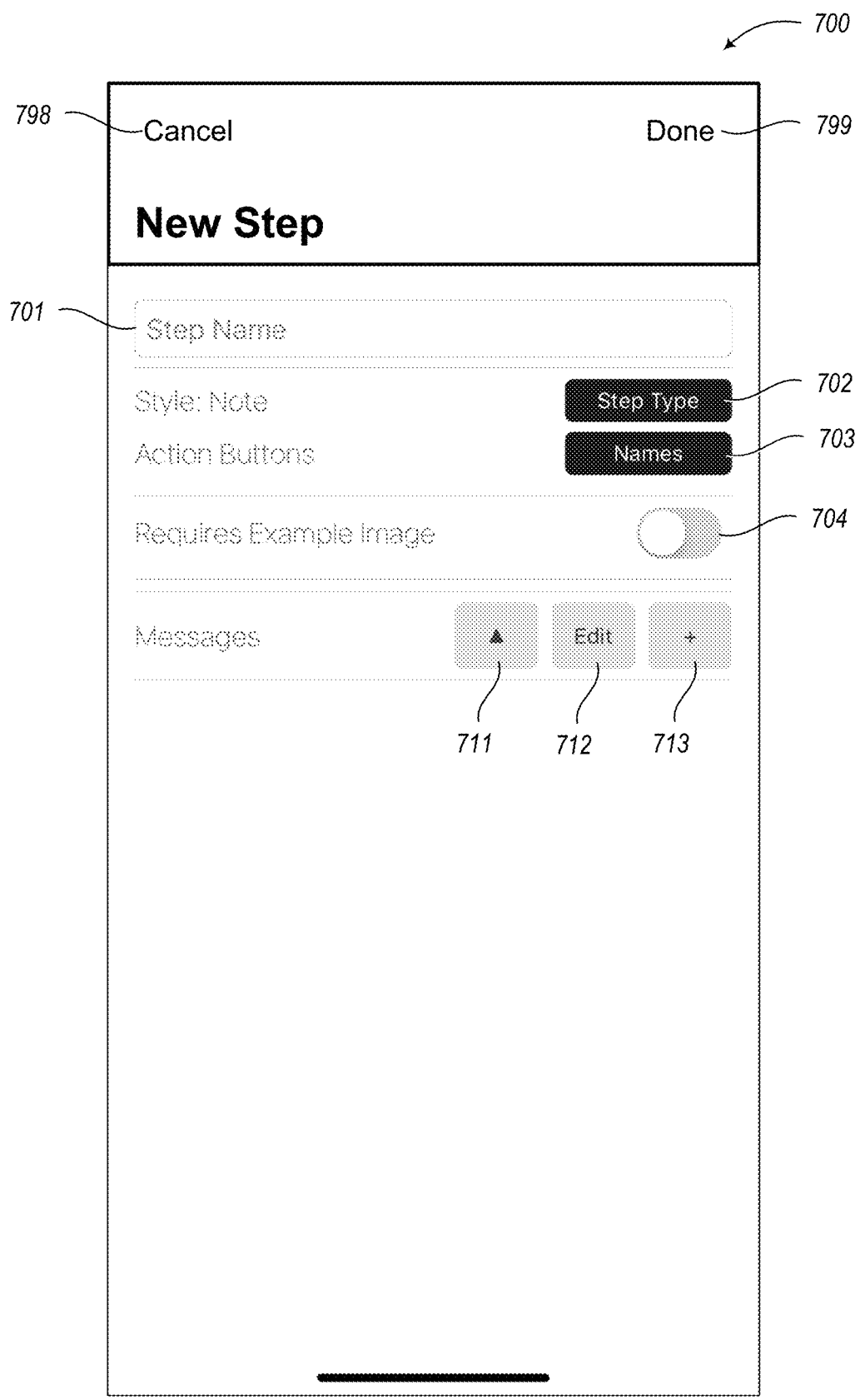
FIG. 7 is a display diagram showing sample contents of a display presented by the facility in some embodiments to begin the process of adding or changing a step of a protocol.

FIG. 7 is a display diagram showing sample contents of a display presented by the facility in some embodiments to begin the process of adding or changing a step of a protocol. The display 700 includes a field 701 for specifying a name for the step; a control 702 for specifying the type of the step; a control 703 for specifying the interaction buttons for the step; a control 704 for specifying whether an example image is to be attached to the step for display to a courier agent who is in the process of performing the step; and controls 711-713 for creating and modifying messages associated with the step.

Figure 8:
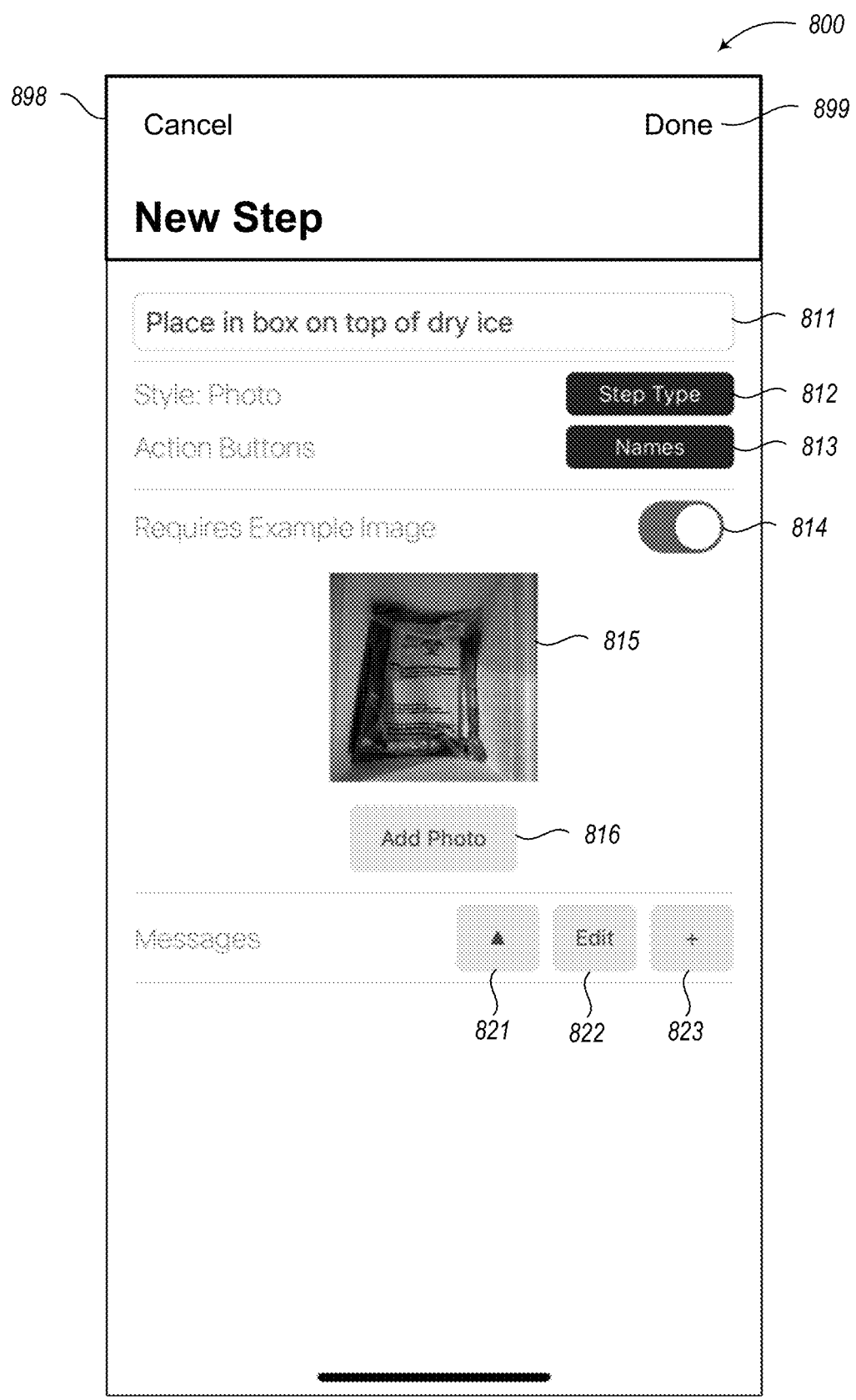
FIG. 8 is a display diagram showing sample contents of a display presented by the facility in some embodiments to complete the definition of a step of a protocol.

FIG. 8 is a display diagram showing sample contents of a display presented by the facility in some embodiments to complete the definition of a step of a protocol. By comparing display 800 in FIG. 8 to display 700 in FIG. 7, it can be seen that field 811 has been populated with the name of the step, "Place in box on top of dry ice." Control 812 has been used to define the step to be a photo step—that is a step in which the courier agent collects a photo as compliance evidence. Control 814 has been used to require an example image for the step; this example image 815 has been added to the step using an add photo control 816 the facility displayed when the required example image control 814 was turned on.

Figure 9:
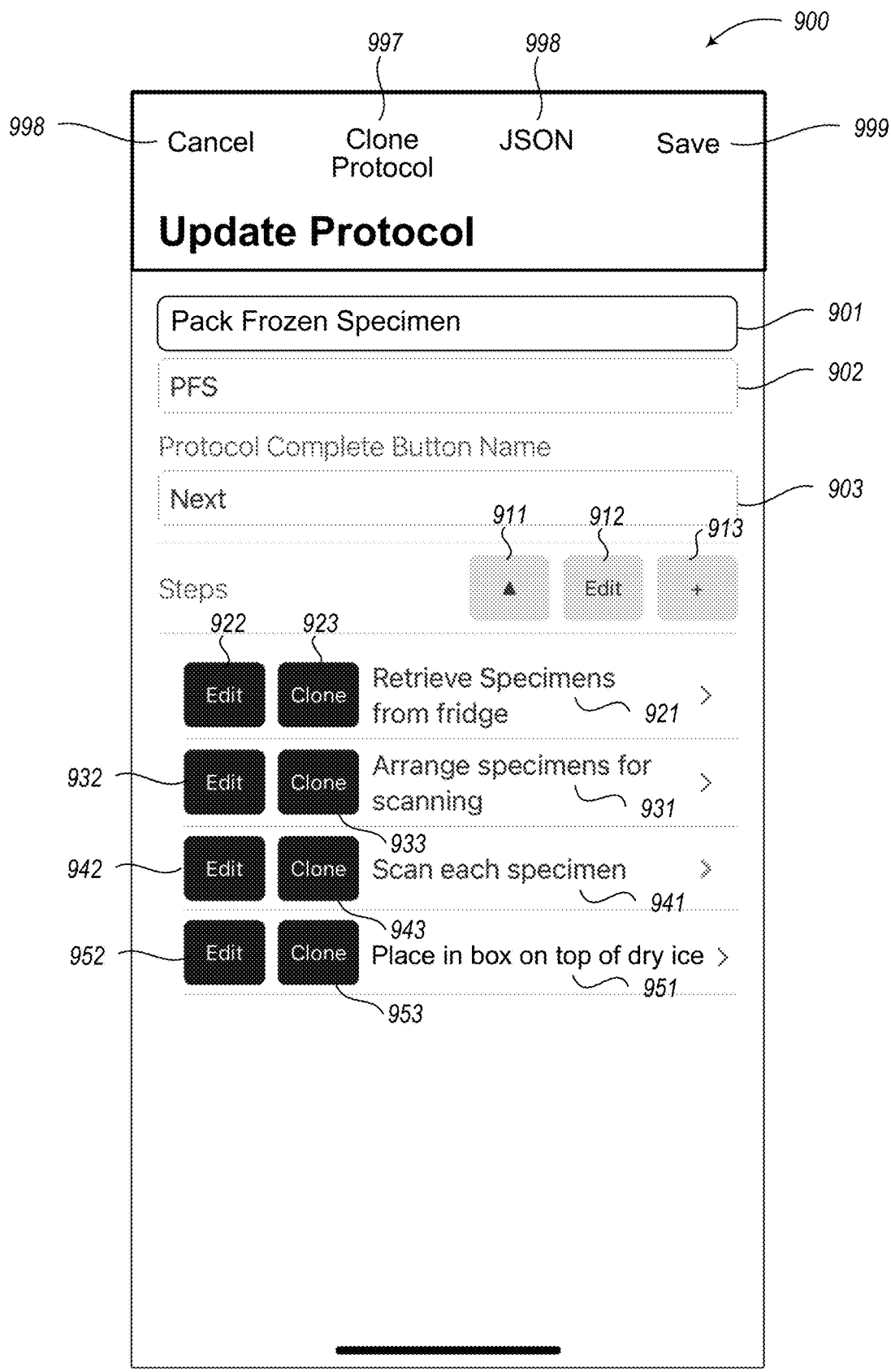
FIG. 9 is a display diagram showing sample contents of a display presented by the facility in some embodiments to show a protocol alter in accordance with user input.

FIG. 9 is a display diagram showing sample contents of a display presented by the facility in some embodiments to show a protocol altered in accordance with user input. In particular, by comparing display 900 shown in FIG. 9 with display 500 shown in FIG. 5, it can be seen that the Pack in Styrofoam step 551 that occurred in the new protocol cloned from the Pack refrigerated specimen protocol has been replaced with a Place in box on top of dry ice step 951. Further, the user has revised the name of the protocol in field 901 to be the Pack Frozen Specimen protocol.

Returning to FIG. 3, in act 306, the facility stores the protocol altered in act 305. After act 306, this process concludes.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into sub acts, or multiple shown acts may be combined into a single act, etc.

Figure 10:
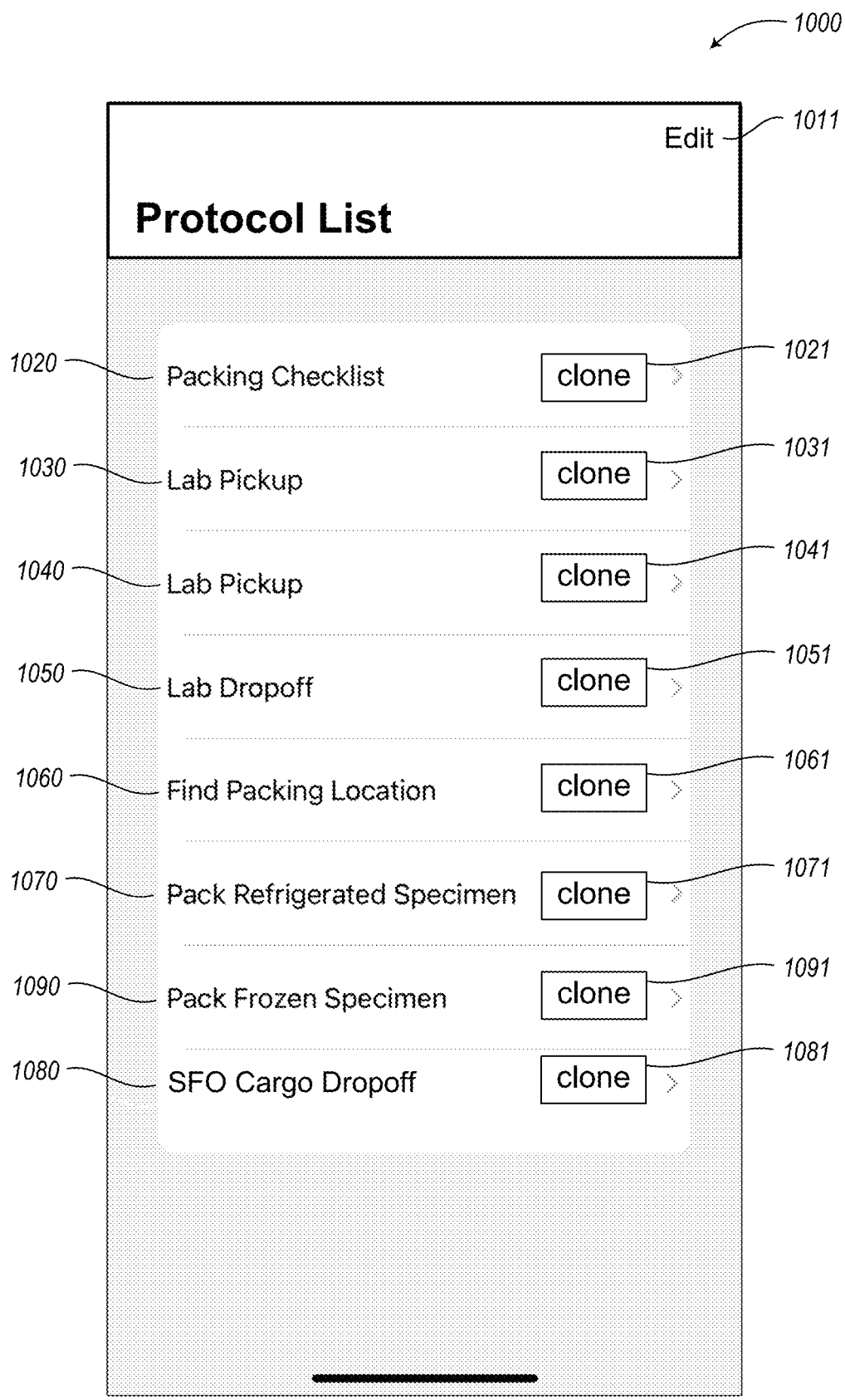
FIG. 10 is a display diagram showing sample contents of a display presented by the facility in some embodiments to show a list of protocols updated to include a new protocol.

FIG. 10 is a display diagram showing sample contents of a display presented by the facility in some embodiments to show a list of protocols updated to include a new protocol. By comparing display 1000 in FIG. 10 with display 400 in FIG. 4, it can be seen that the facility has added the new Pack Frozen Specimen protocol 1090 defined in the example shown in FIGS. 5-9.

Figure 11:
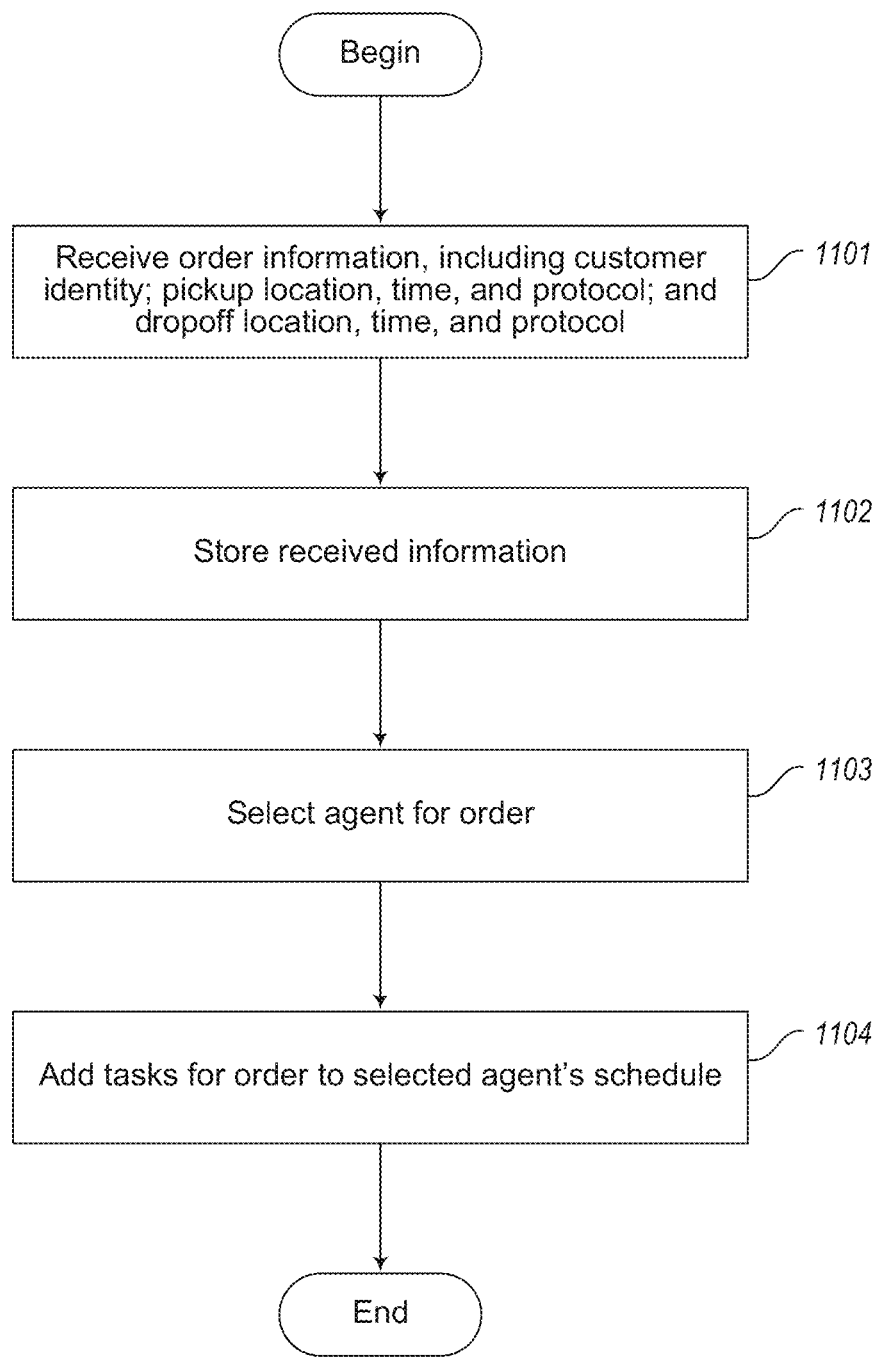
FIG. 11 is a flow diagram showing a process performed by the facility in some embodiments to create and schedule a new courier order.

FIG. 11 is a flow diagram showing a process performed by the facility in some embodiments to create and schedule a new courier order. In act 1101, the facility receives information describing the order. In some embodiments, this information includes the identity of the customer; a location, time, and protocol for the order's pickup; and a location, time, and protocol for the order's dropoff. In various embodiments, the facility uses a variety of techniques for receiving the order information in act 1101.

FIG. 12 is a display diagram showing sample contents of a display presented by the facility in some embodiments to permit a customer to place a courier order directly, such as by filling out and posting a web form served by the server. The display 1200 includes fields into which the customer can enter the following information: the name 1211 of the person filling out the form; an invoice number 1212 or other information used to connect the order to a customer's electronic and/or physical records that relate to the order; for the pickup, a location name 1221, address 1222, room number 1223, city 1224, state 1225, and zip code 1226; the name 1227 of someone to contact at the pickup location, and that person's phone number 1228; any notes 1229 the customer has about the pickup; date 1231 and time 1232 for the pickup; and a pickup protocol 1235 specified for the pickup, here a "pack frozen specimen" protocol whose creation is shown in FIGS. 4-10 and discussed above. The display includes parallel fields for entering similar information about the dropoff portion of the order: a destination location name 1241, address 1242, room number 1243, city 1244, state 1245, and zip code 1246. A name 1247 and phone number 1248 for the destination contact. Customer notes 1249 about the dropoff; and dropoff date 1251 and time 1252. Also, a dropoff protocol 1255 to use in performing the dropoff.

In various embodiments, the customer can use various techniques for entering the pickup and dropoff protocols, including typing the entire name for the protocol; typing the beginning of the name of the protocol to use an autocomplete feature; selecting a protocol from a list of available protocols in a dropdown or popup list; etc.

When the customer has completed the web form shown in display 1200, the customer submits it for receipt in act 1101.

Figure 13:
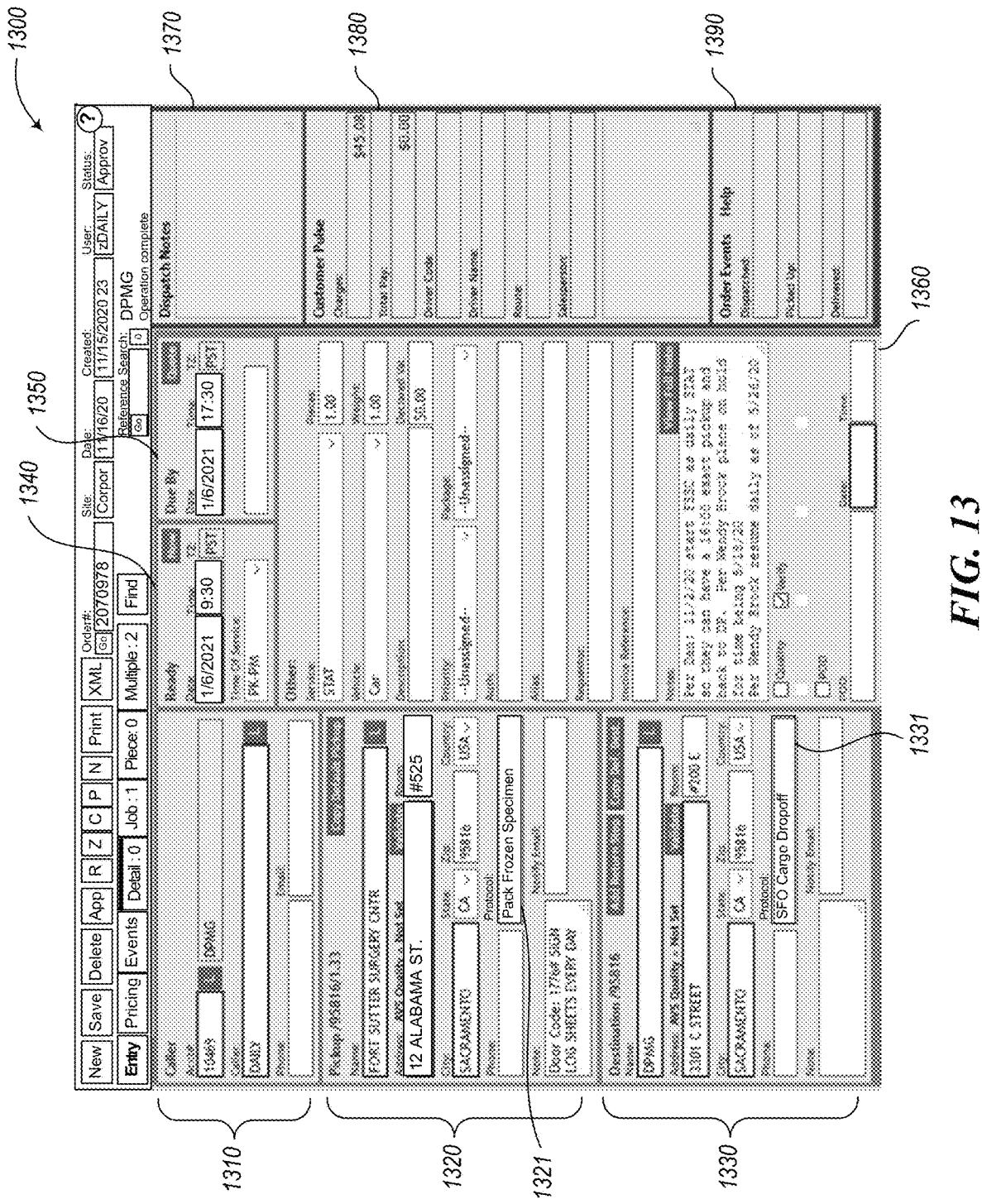
FIG. 13 is a display diagram showing sample contents of a display presented by the facility in some embodiments to permit an order entry clerk who works for the courier service to create an order, such as in response to communications from a customer via telephone, email, text messages, video call, etc.

FIG. 13 is a display diagram showing sample contents of a display presented by the facility in some embodiments to permit an order entry clerk who works for the courier service to create an order, such as in response to communications from a customer via telephone, video call, email, text messages, etc. The display 1300 is a form into which the courier service order clerk enters information about the order. In various embodiments, the form is displayed programmatically by the facility or a third-party ordering system, or as a web form displayed by the facility or a third-party ordering system. The form includes information about the customer 1310; the pickup portion of the order 1320; and the dropoff portion of the order 1330. This information generally parallels the information discussed above in connection with FIG. 12. The pickup information includes specification 1321 on the pickup protocol to be used in performing the pickup portion of the order. Similarly, the destination information includes specification 1331 of dropoff protocol to be used in performing the dropoff portion of the order. The order entry clerk can enter this information in any of the ways discussed above in connection with the protocol fields in FIG. 12. The form further includes pickup time information 1340, dropoff time information 1350, dispatch notes 1370, customer pulse information 1380, order event information 1390, and various other information 1360. After the order entry clerk has completed this form, the order entry clerk submits it for receipt by the facility in act 1101.

Returning to FIG. 11, in act 1102, the facility stores the information received in act 1101. In act 1103, the facility selects a courier agent to perform the order. In various embodiments, the facility considers various factors in the selection of an agent to perform the order including, for example, whether the agent has been trained on the pickup and dropoff protocols specified for the order; whether the agent has proven competence at the specified pickup and dropoff protocols; whether the agent has successfully completed a third-party certification or training; whether the agent operates in the geographic area containing the pickup and dropoff locations; whether the agent has or can obtain and use an appropriate vehicle for the order; whether the agent has or can obtain equipment or materials required by the order; whether the agent is scheduled to work at the pickup and dropoff times, or can be scheduled to work them; whether the agent is free at the specified pickup and dropoff times; etc.

For example, typical third-party certifications and trainings include:
TSA
HIPAA
Human biohazard
Insurance coverage
Safe driving For example, some of the kinds of equipment and supplies required for particular orders include:
Temperature sensor
Coolers
Uniform
Badge
Dry Ice (and how many kg)
Stickers such as biohazard stickers, dry ice stickers, etc.
Airbills for different air and ground cargo companies
Packing boxes, of different types required for different logistics programs, such as dual-compartment TSA-certified double-liquid-sealed containers
Plastic bags to line packing boxes
Medical gloves
Insulated medical tote
Biohazard spill kit
DOT authorization letter
CDC Permit
Gel cool packs
"C" Culture stickers
Closed toed shoes
Safety glasses
Packing tape
Paper towels In some embodiments (not shown), the facility interacts with each courier agent via the facility's mobile app to solicit information about the courier agent used to match the courier agent with orders, such as the matching information described above. In various embodiments, the facility solicits this information from a courier agent when they sign on for their shift; at an earlier time; or in response to the need to assign an order having particular requirements.

In some embodiments, when a courier agent provides particular matching information, the facility solicits from the courier agent evidence of this matching information, such as a certification document or training document identifying the courier agent, or a photo of supplies, a piece of equipment, or a vehicle possessed by the courier agent.

In act 1104, the facility adds tasks for the order to the schedule of the agent selected in act 1103. In various embodiments, the tasks added include a pickup task, using the pickup protocol; a dropoff task, using the dropoff protocol; packing or otherwise preparing to work the agent's shift containing the order in a way that prepares them to perform the order, such as collecting and storing in an appropriate vehicle any materials or information needed to perform the pickup and dropoff protocols for the order, or maintain the item safely between its pickup and its dropoff; etc. In some embodiments (not shown), before adding one or more tasks to the selected agent's schedule in act 1104, the facility sends a communication to the selected agent proposing this addition, and completes it only if the selected agent assents. If the selected agent does not assent, the facility continues in act 1103 to select a new agent. After act 1104, this process concludes.

Figure 14:
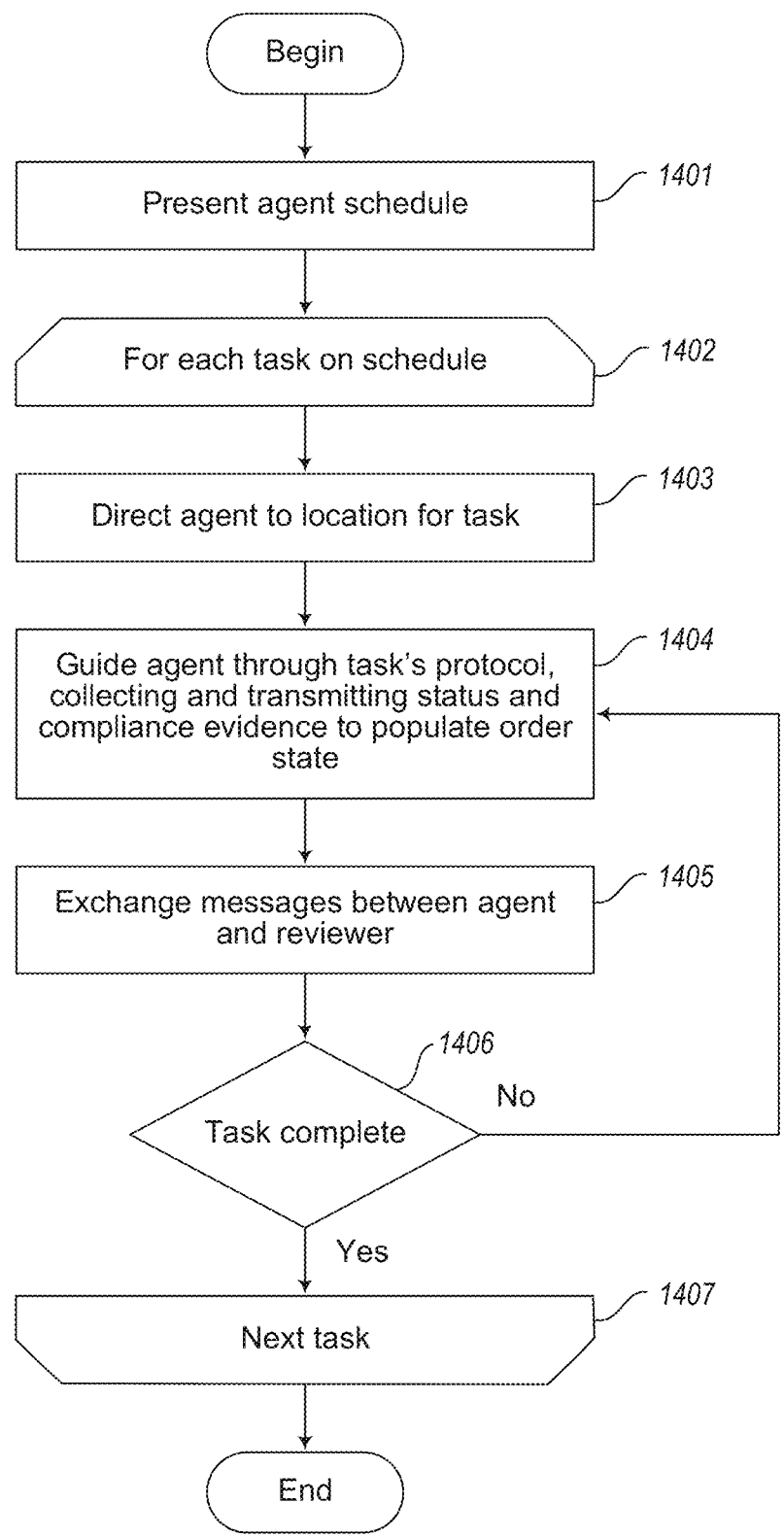
FIG. 14 is a flow diagram showing a process performed by the facility in some embodiments to direct the work of a courier agent.

FIG. 14 is a flow diagram showing a process performed by the facility in some embodiments to direct the work of a courier agent. In act 1401, the facility presents an agent schedule. In some embodiments, this is performed using a portion of the facility operating as a mobile app on a mobile device carried by the agent, such as a smart phone or tablet. In some embodiments, the agent schedule is performed by a third-party courier dispatch software product.

Figure 15:
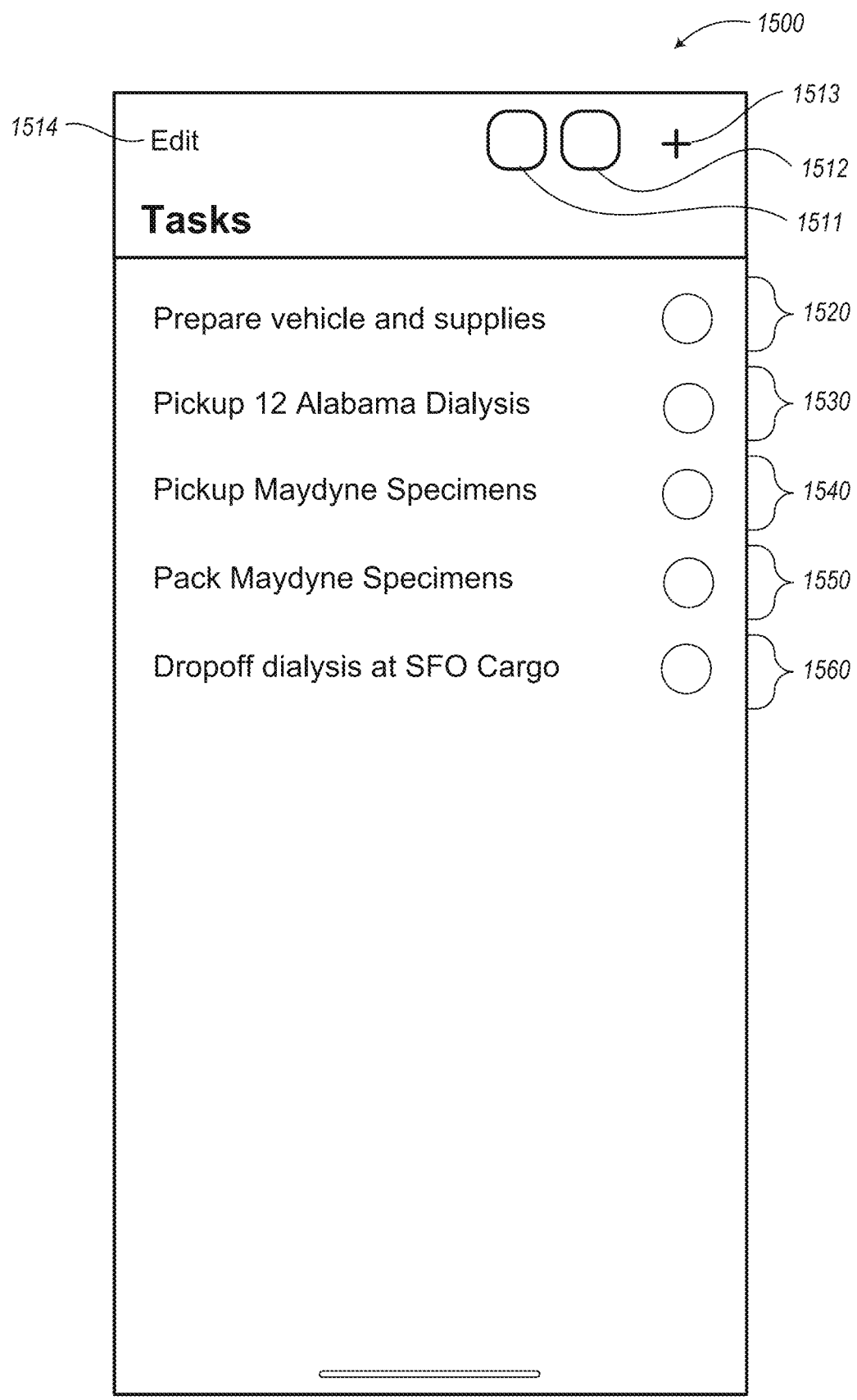
FIG. 15 is a display diagram showing sample contents of a display presented by the facility in some embodiments to present an initial schedule for a courier agent to the courier agent.

FIG. 15 is a display diagram showing sample contents of a display presented by the facility in some embodiments to present an initial schedule for a courier agent to the courier agent. The display 1500 includes a list of tasks: an initial task 1520 automatically populated with the steps needed to prepare to perform substantive tasks 1530, 1540, 1550, and 1560. In particular, tasks 1530 and 1560 relate to the sample order discussed above: task 1530 is this order's pickup task, while task 1560 is this order's dropoff task. None of these tasks are presented with a check mark, indicating that they all remain to be performed, in the specified order.

Returning to FIG. 14, in acts 1402-1407, the facility loops through each task on the schedule, such as the five tasks shown in FIG. 15. In act 1403, the facility directs the agent to the location for the task. In some embodiments, this involves invoking the navigation function of a mapping mobile app with respect to the task-geographic location. In some embodiments, the facility contains native functionality for doing this. In some embodiments, the third-party courier dispatch software product performs act 1403.

In act 1404, the facility guides the agent through the protocol specified for the task, collecting and transmitting status and compliance evidence to the facility's server in order to populate the order state for the order that the task is part of. In some embodiments, the facility attaches metadata such as GPS location and timestamp to each piece of compliance evidence that it collects and transmits. In some embodiments, the facility performs act 1404 in response to an API call by the third-party courier dispatch software product, passing an identifier for the task known to both the facility and the third-party courier dispatch software product.

Figure 16:
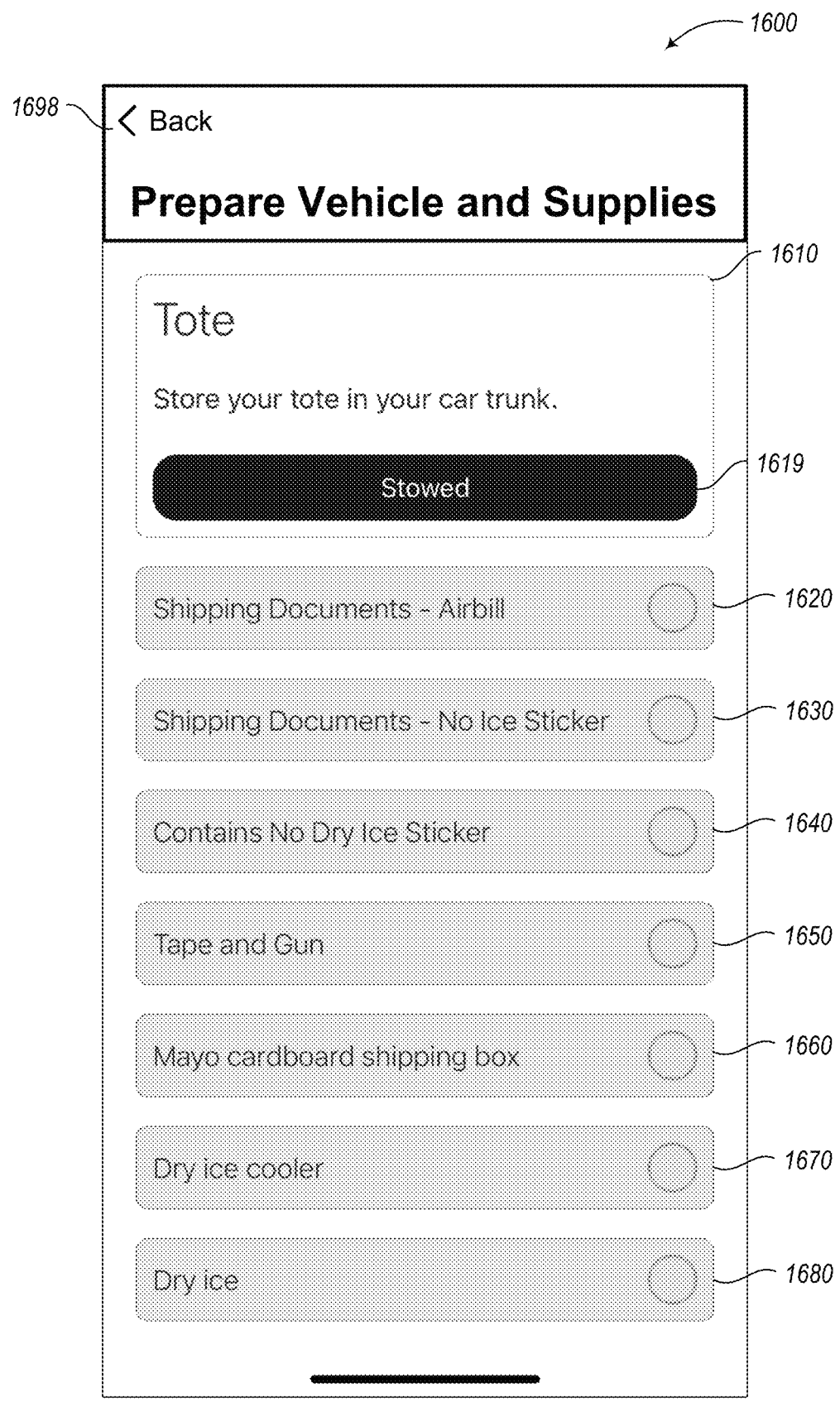
FIG. 16 is a display diagram showing sample contents of a display presented by the facility in some embodiments to guide an agent through the protocol for the next task on the agent's task list.

FIG. 16 is a display diagram showing sample contents of a display presented by the facility in some embodiments to guide an agent through the protocol for the next task on the agent's task list. The display 1600 relates to task 1520 shown in FIG. 15. In some embodiments, the facility presents display 1600 in response to the user's activation of task 1520. The display includes a list of the steps making up the Prepare Vehicle and Supplies task: steps 1610, 1620, 1630, 1640, 1650, 1660, 1670, and 1680. In some embodiments, where a task has a larger number of steps, the facility presents a scrolling list of these tasks, presents them at a lower level of magnification, presents them in multiple columns, etc. It can be seen that the current, first step 1610 has been expanded to provide instructions to the user about how to perform the step, as well as a control 1619 for the agent to indicate his or her completion of the step. In some embodiments, in response to the agent's activation of control 1619, the facility unexpands step 1610; displays a check mark next to it indicating its completion; and expands the next step, step 1620, to show its details and instructions (not shown). In some embodiments, the agent's activation of control 1619 also causes the portion of the facility executing on the agent's mobile device to transmit updated status information for the order to the server indicating the beginning of the prepare vehicle and supplies task, and the completion of the tote step.

Figure 17:
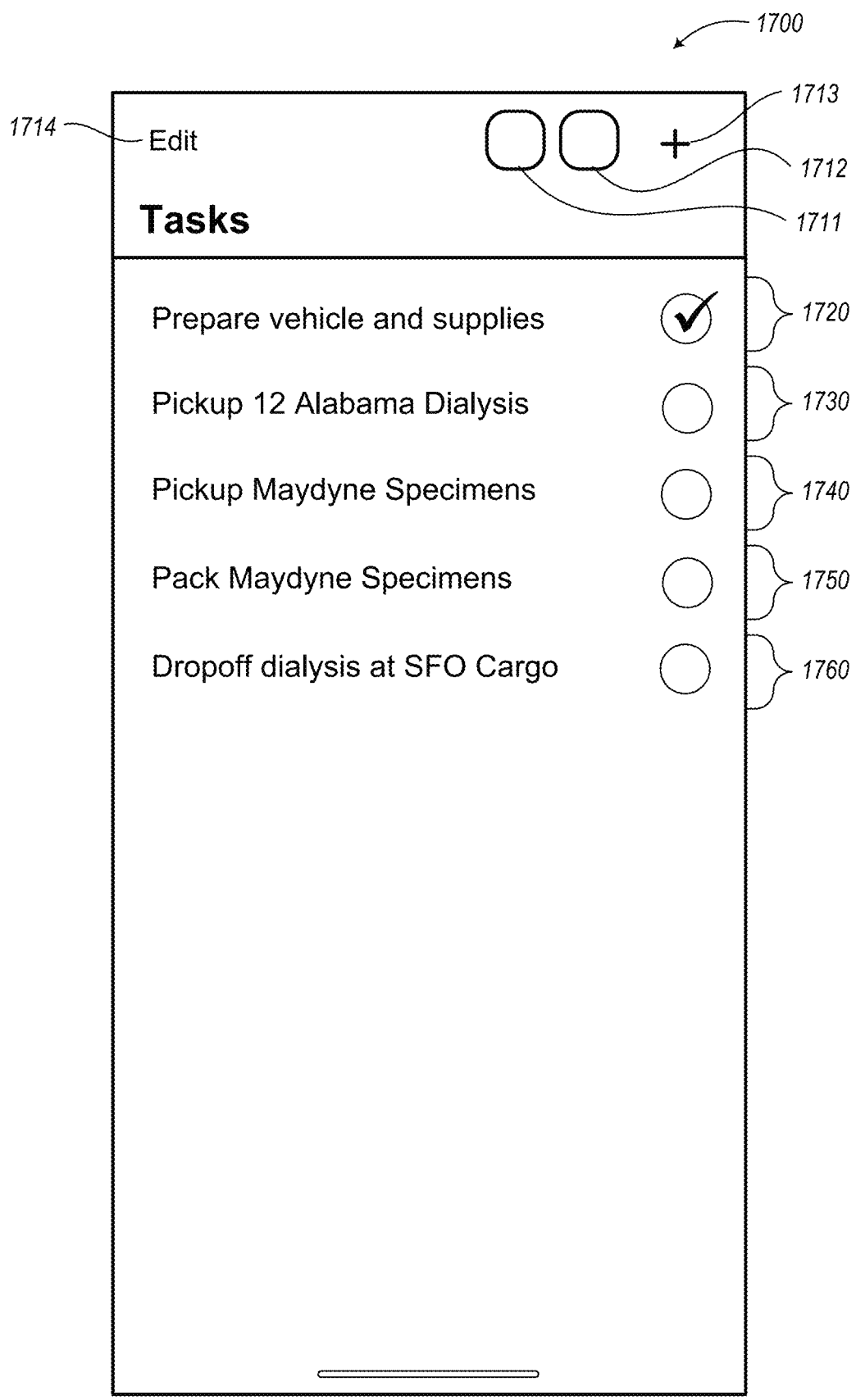
FIG. 17 is a display diagram showing sample contents of a display presented by the facility in some embodiments to update the agent's schedule with the completion of the first task.

FIG. 17 is a display diagram showing sample contents of a display presented by the facility in some embodiments to update the agent's schedule with the completion of the first task. By comparing display 1700 to display 1500 shown in FIG. 15, it can be seen that the Prepare vehicle and supplies task 1720 has a check mark, indicating its completion. Thus, the agent's next activity is to begin the Pickup 12 Alabama Dialysis task 1730.

Figure 18:
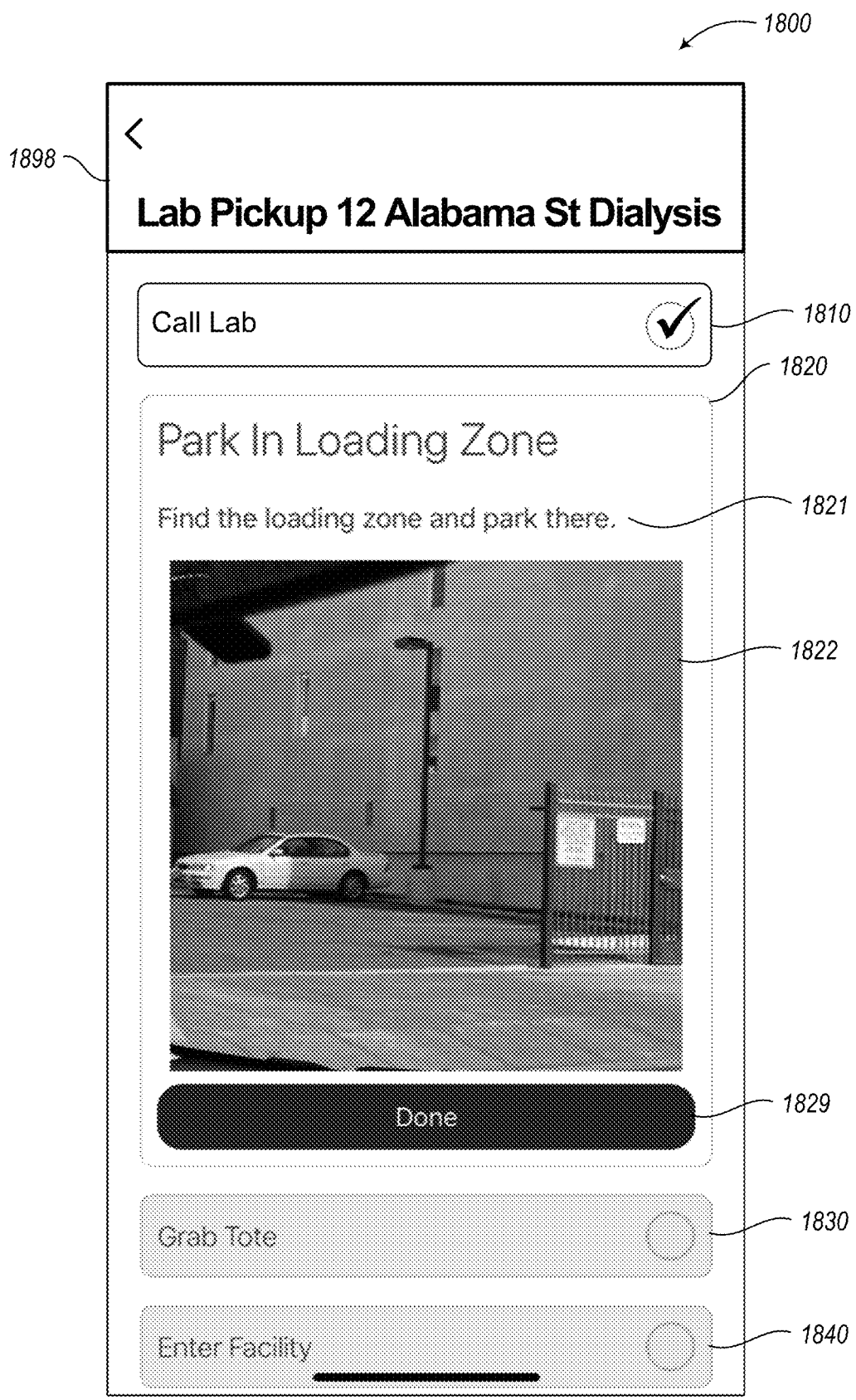
FIG. 18 is a display diagram showing sample contents of a display presented by the facility in some embodiments to show steps of a substantive courier task.

FIG. 18 is a display diagram showing sample contents of a display presented by the facility in some embodiments to show steps of a substantive courier task. In some embodiments, the facility presents display 1800 in response to the agent's activation of task 1730. It can be seen that the display 1800 contains an initial portion of the lab at pickup 12 Alabama Street dialysis task's step list, steps 1810, 1820, 1830, and 1840. The agent can scroll the display vertically to display additional steps that occur later in the task. It can be seen by the check mark in step 1810 that the Call Lab step has been completed. Step 1820, the present step, is expanded to include the instructions 1821, as well as an example image 1822 showing visual information about how to complete the step, in this case a photo of the loading zone in which the agent is to park. Step 1820 also includes a control 1829 for the agent to activate when the Park In Loading Zone step is completed. The user will go on to perform each of the steps listed for this task in order. In this case, one of the later steps of the lab pickup 12 Alabama Street dialysis task is an embedded task for the pack frozen specimen protocol specified for the example order.

Figure 19:
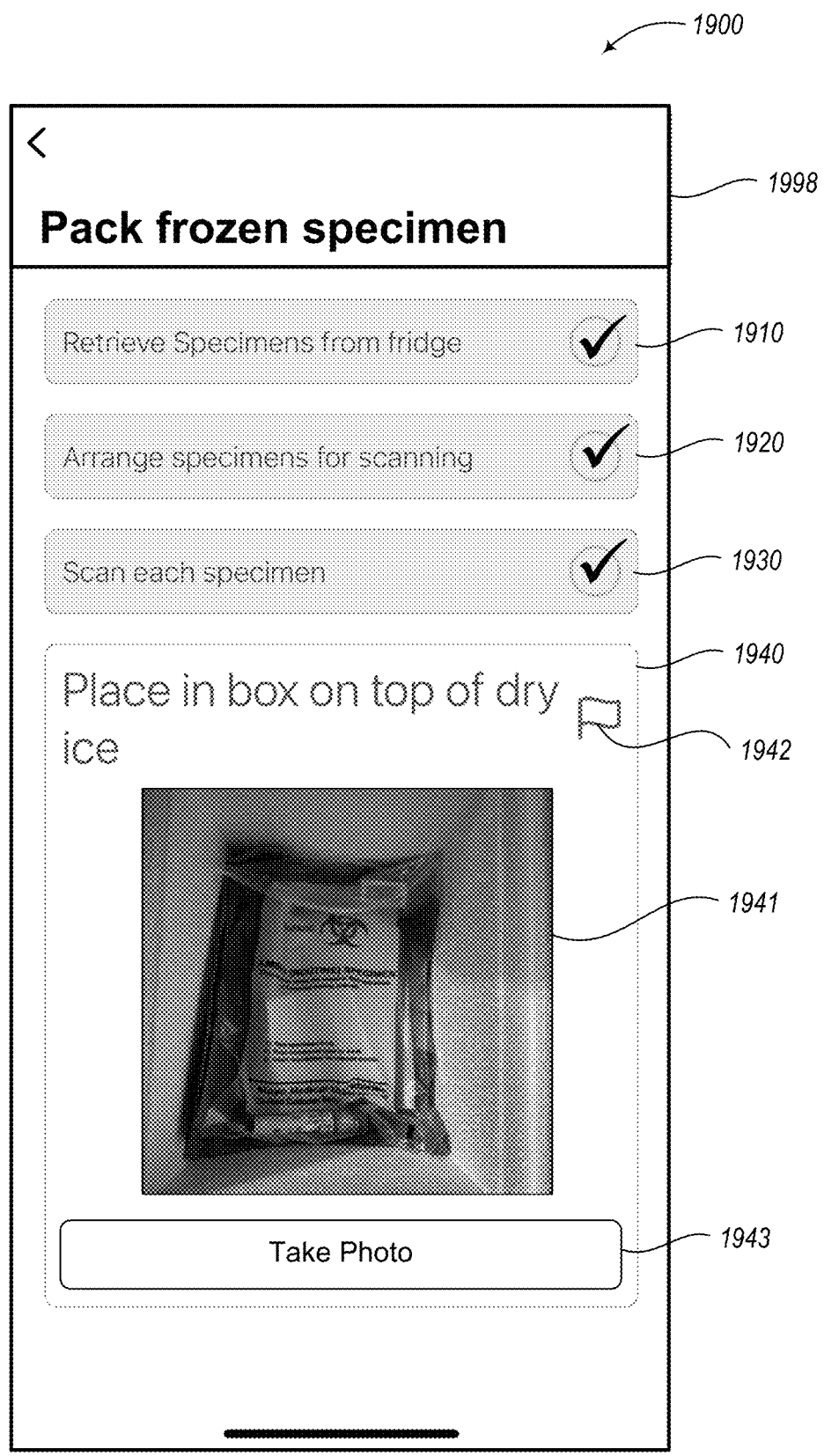
FIG. 19 is a display diagram showing sample contents of a display presented by the facility in some embodiments to show the steps of the pack frozen specimen subtask.

FIG. 19 is a display diagram showing sample contents of a display presented by the facility in some embodiments to show the steps of the pack frozen specimen subtask. In display 1900, it can be seen that the agent has performed steps 1910, 1920, and 1930. Step 1940 is expanded, and includes example photo 1941. It also contains control 1943 prompting the agent to take a photo of the results of performing this step, in other words, placing the specimen in a box on top of dry ice as depicted in the example image. If the agent has any trouble completing the step, the agent can activate a flag icon 1942 in order to communicate with a reviewer of the order, such as a courier dispatcher, a customer representative, a person at the pickup location involved with this pickup task, etc.

Figure 20:
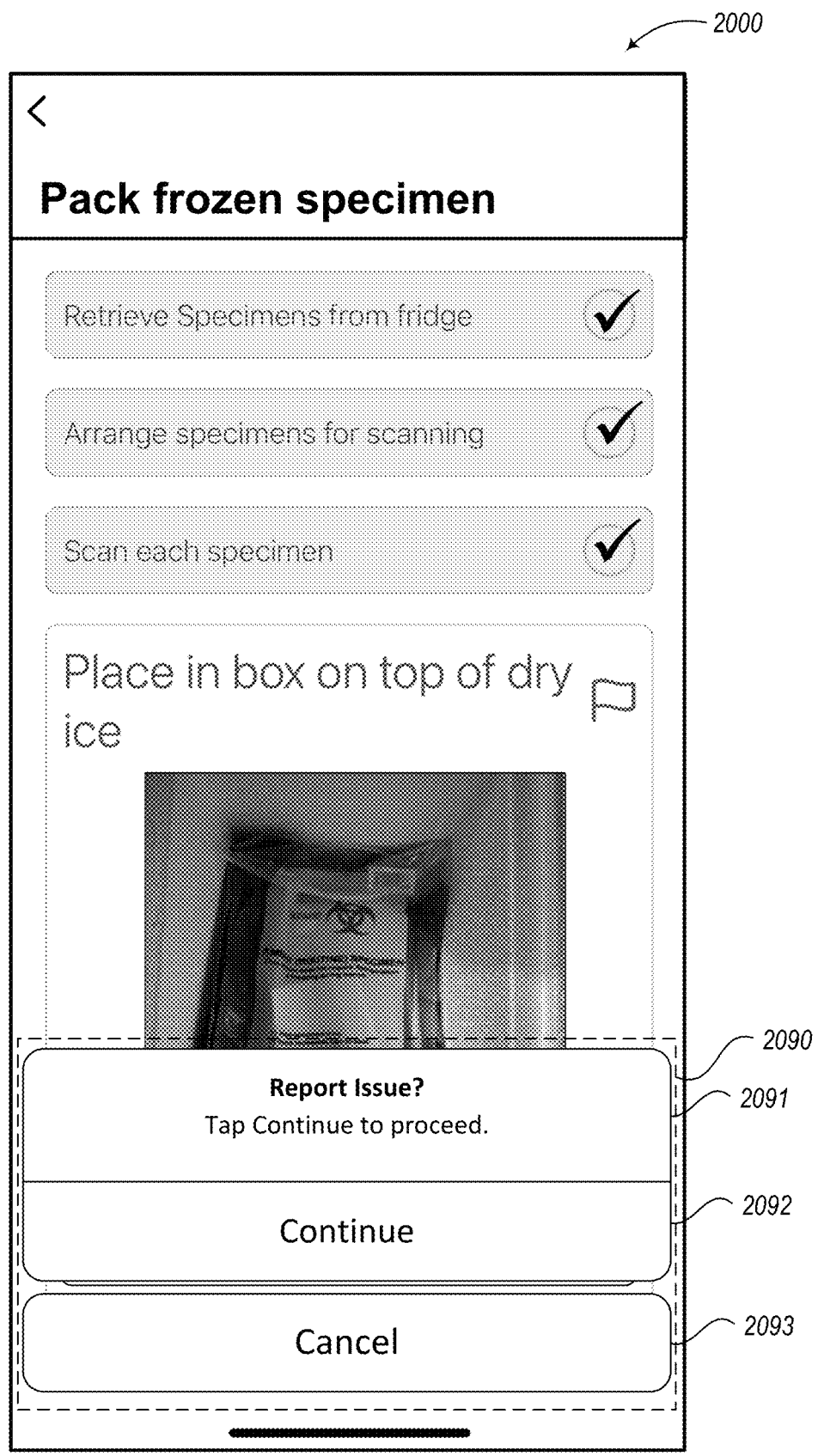
FIG. 20 is a display diagram showing sample contents of a display presented by the facility in some embodiments to enable an agent to confirm their wish to communicate with a reviewer.

FIG. 20 is a display diagram showing sample contents of a display presented by the facility in some embodiments to enable an agent to confirm their wish to communicate with a reviewer. In some embodiments, the facility presents the display 2000 in response to the user's activation of flag icon 1942 shown in FIG. 19. In display 2000, a confirmation window 2090 has been displayed over a portion of the step list. The agent can activate control 2092 in order to begin communicating with a reviewer, or activate control 2093 to cancel their communication action and return to the step list. An example of the communication that follows the agent's activation of the continue control 2092 is discussed below in connection with FIGS. 22-25.

Figure 21:
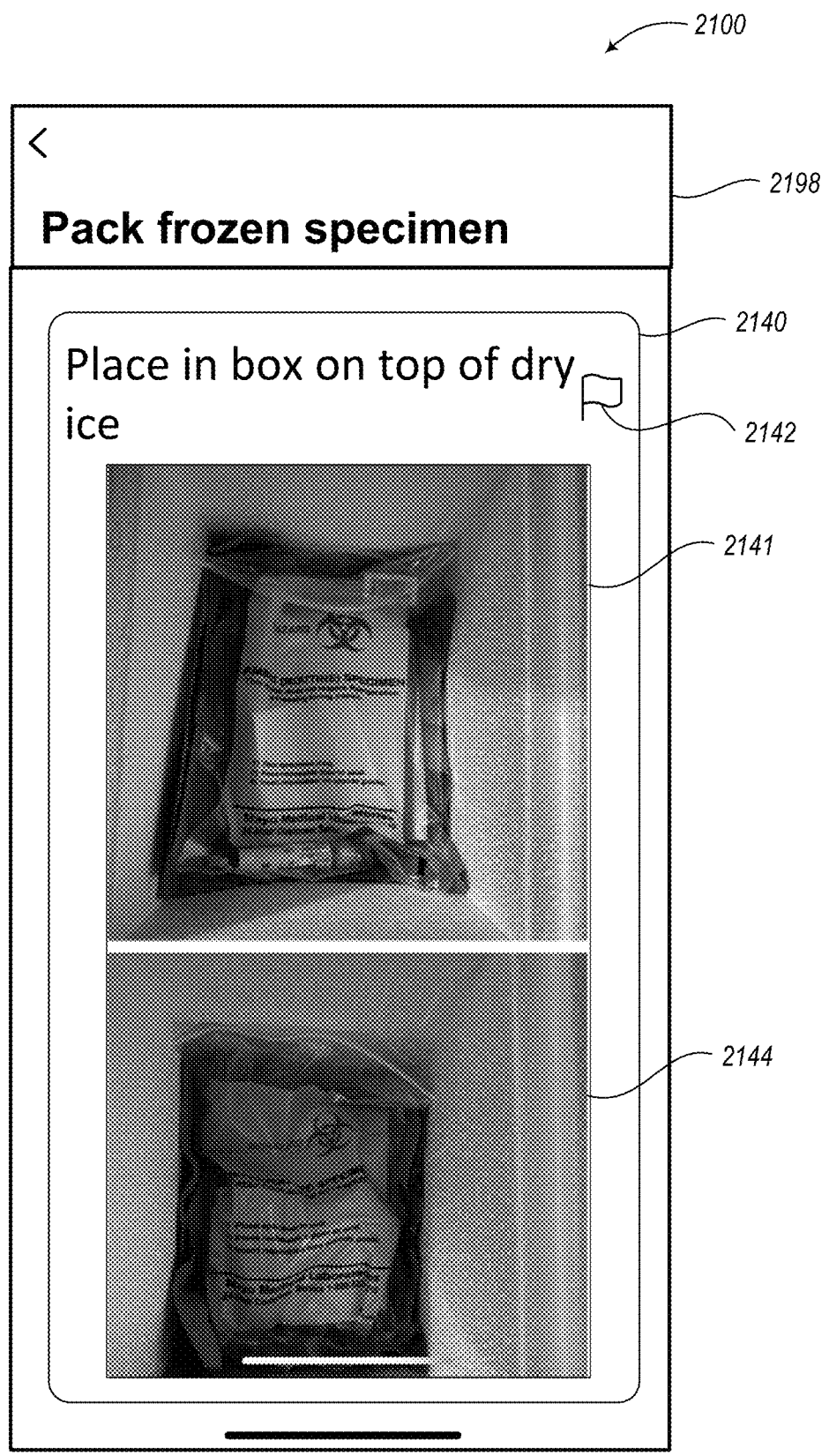
FIG. 21 is a display diagram showing sample contents of a display presented by the facility in some embodiments to show the capture of compliance evidence for a particular step.

FIG. 21 is a display diagram showing sample contents of a display presented by the facility in some embodiments to show the capture of compliance evidence for a particular step. The display 2100 contains a further-expanded version of the Place in box on top of dry ice step 2140. It reflects the capture of a compliance evidence photograph 2144 for this step, captured and added by the facility in response to the agent's activation of the take photo control 1943 shown in FIG. 19.

During the process of performing the Pack frozen specimen task, the portion of the facility executing on the agent's mobile device has transmitted updates to the order state for this order to the facility's server, including step completion and compliance evidence, including compliance photo 2144. This order status and compliance information uploaded to the facility's server from the agent's mobile device is available to reviewers authorized to access the order via a reviewer user interface provided by the facility.

Returning to FIG. 14, in act 1405, the facility exchanges messages between the agent and reviewers who can access their orders at the instigation of either of these parties. FIGS. 22-25 show a facility's reviewer user interface with respect to messaging interactions between a reviewer and a courier agent.

Figure 22:
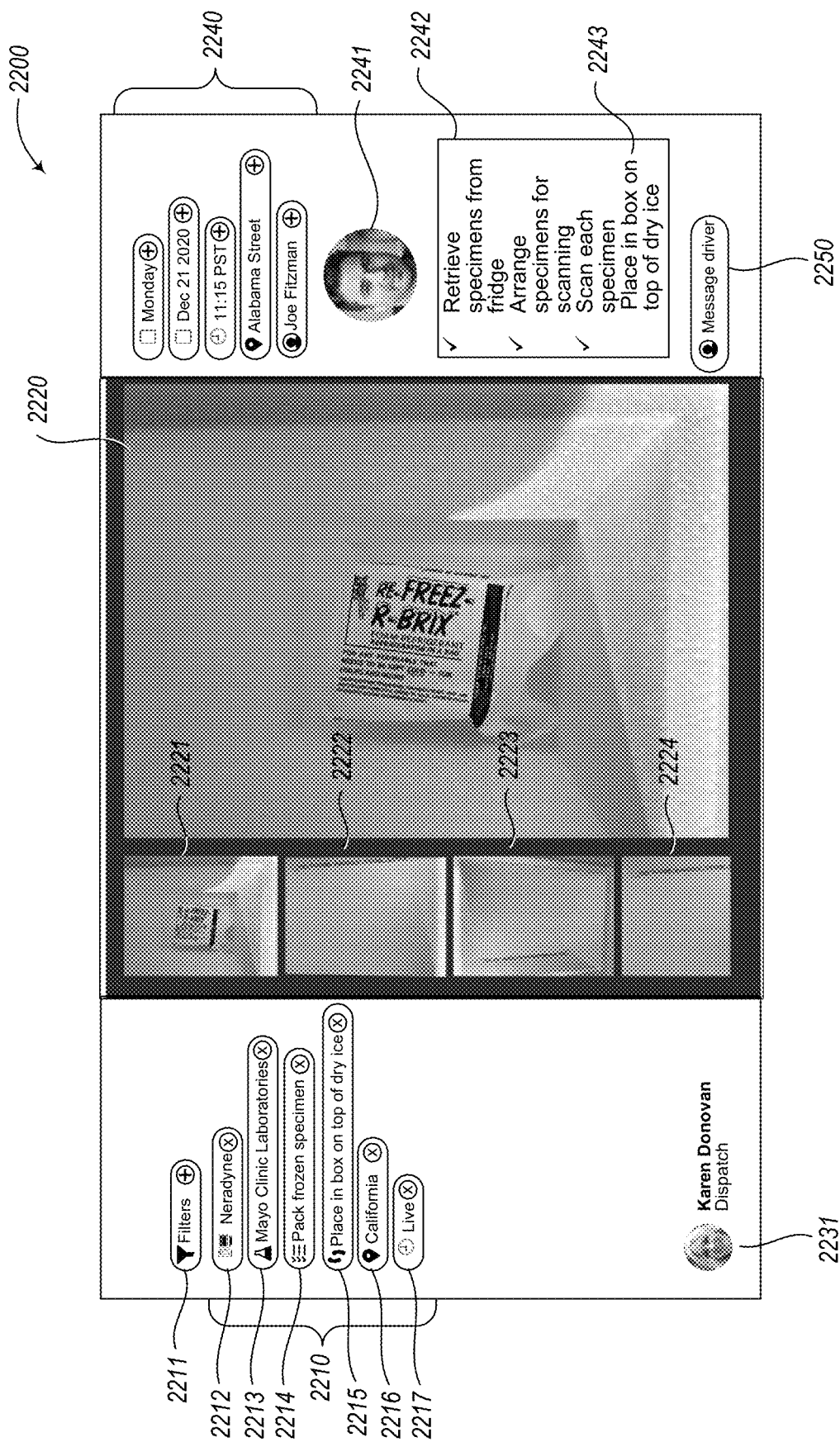
FIG. 22 is a display diagram showing sample contents of the reviewer user interface at a first time.

FIG. 22 is a display diagram showing sample contents of the reviewer user interface at a first time. The user interface display 2200 identifies its user as a dispatcher named Karen Donovan 2231. The display also includes a set of filters 2210 that the reviewer can specify in order to select different subsets of the orders accessible to him or her. For example, all orders may be accessible to a reviewer who is a dispatcher, or all orders for the dispatcher's courier service, or, where a courier service has multiple dispatchers, only those orders assigned to a particular dispatcher. For a customer reviewer, the facility may provide access to all orders for that customer, or some subset of those orders based upon permissions specified by the customer placing the order. In some embodiments, the level of access accorded to each person is configurable by operators of the facility.

The filters operate with respect to different attributes of the order, such as pickup location 2212, destination location 2213, protocol 2214, step 2215 of that protocol, geographic region 2216, and time of performance 2217. The reviewer can remove any of these filters by activating the x-shaped delete control at their right end. The reviewer can add additional filters by activating the +-shaped control at the right end of a filters bubble 2211. By specifying the filters 2210, the reviewer has focused on a particular order corresponding to the example discussed above. Attributes 2240 of this order are displayed, including day, date, time, geographic location, and courier agent name. A photo 2241 of the assigned courier agent is also shown. Also displayed is a list 2242 of the steps of the task, in which check marks identify steps that have been completed. Based upon those check marks, it can be seen that step 2243 is in progress.

A stream of compliance evidence for this order is also displayed, including photos 2221-2224. In some embodiments, the facility maintains collected compliance evidence in a manner compliant with HIPAA, and/or other privacy laws, regulations, or practices. In some embodiments (not shown), the facility uses a visual filtering technique, such as one based upon machine learning, that detects patient information—such as a name or birthdate—in photos or other compliance evidence and blurs it out or otherwise obscures it when stored and/or when displayed. Photo 2221, the most recent photo, has been selected by the reviewer, and thus is displayed at greater magnification as image 2220. By reviewing image 2220, the reviewer can tell that the agent has placed an ice pack at the bottom of a cooler box, rather than the dry ice called for by step 2243. Accordingly, the reviewer can activate control 2250 in order to send the message to the driver pointing out the error and requesting remediation.

Figure 23:
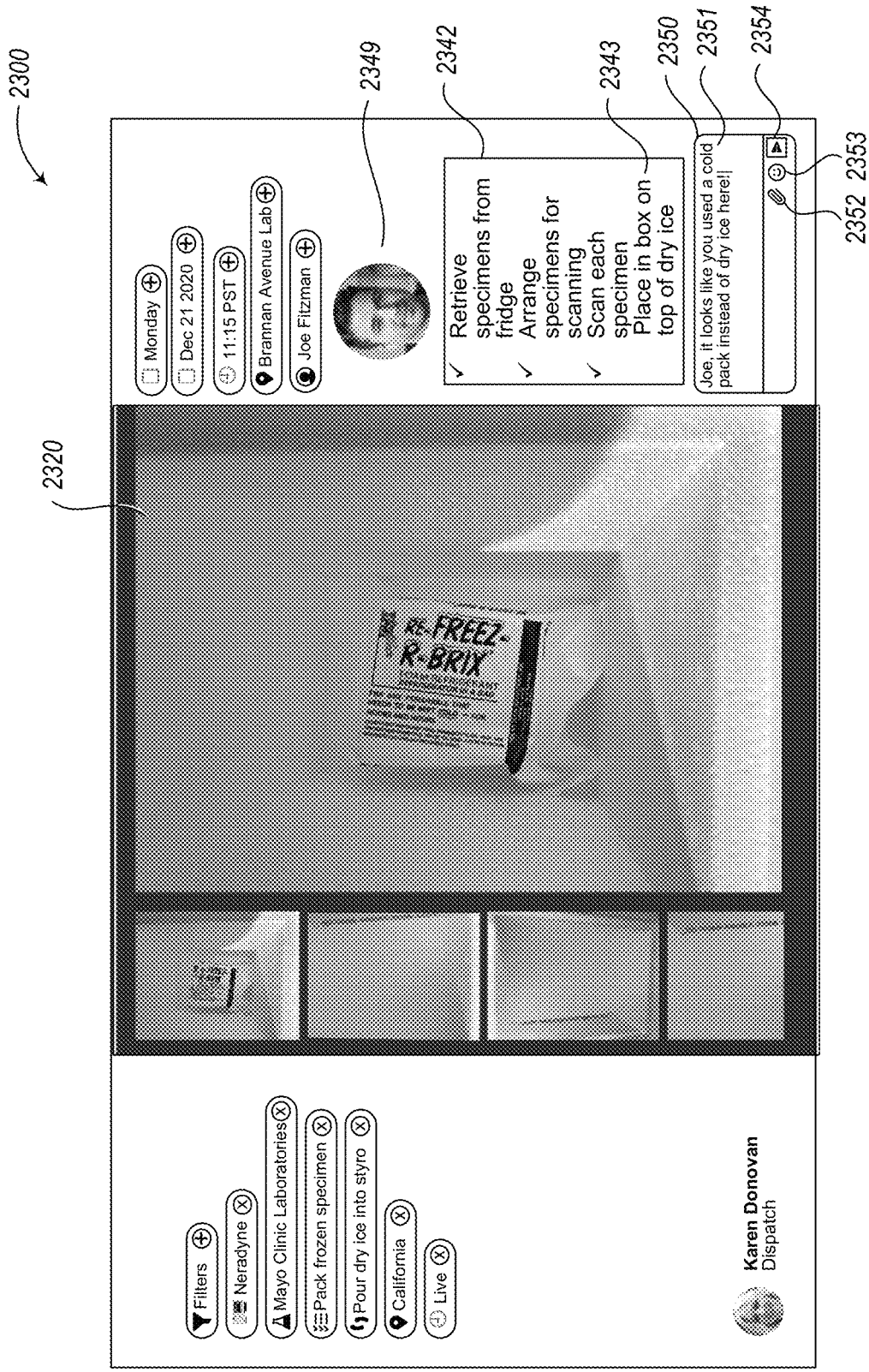
FIG. 23 is a display diagram showing sample contents of the reviewer user interface at a second time.

FIG. 23 is a display diagram showing sample contents of the reviewer user interface at a second time. By comparing the user interface display 2300 to user interface display 2200 shown in FIG. 22, it can be seen that, by activating message control 2250, the reviewer has caused the display of a messaging window 2350. The messaging window includes a new message field 2351 where the reviewer can type messages to the courier, and a row of messaging controls, including a carat-shaped button 2354 at the right end that the reviewer can activate in order to send the entered message to the courier.

Figure 24:
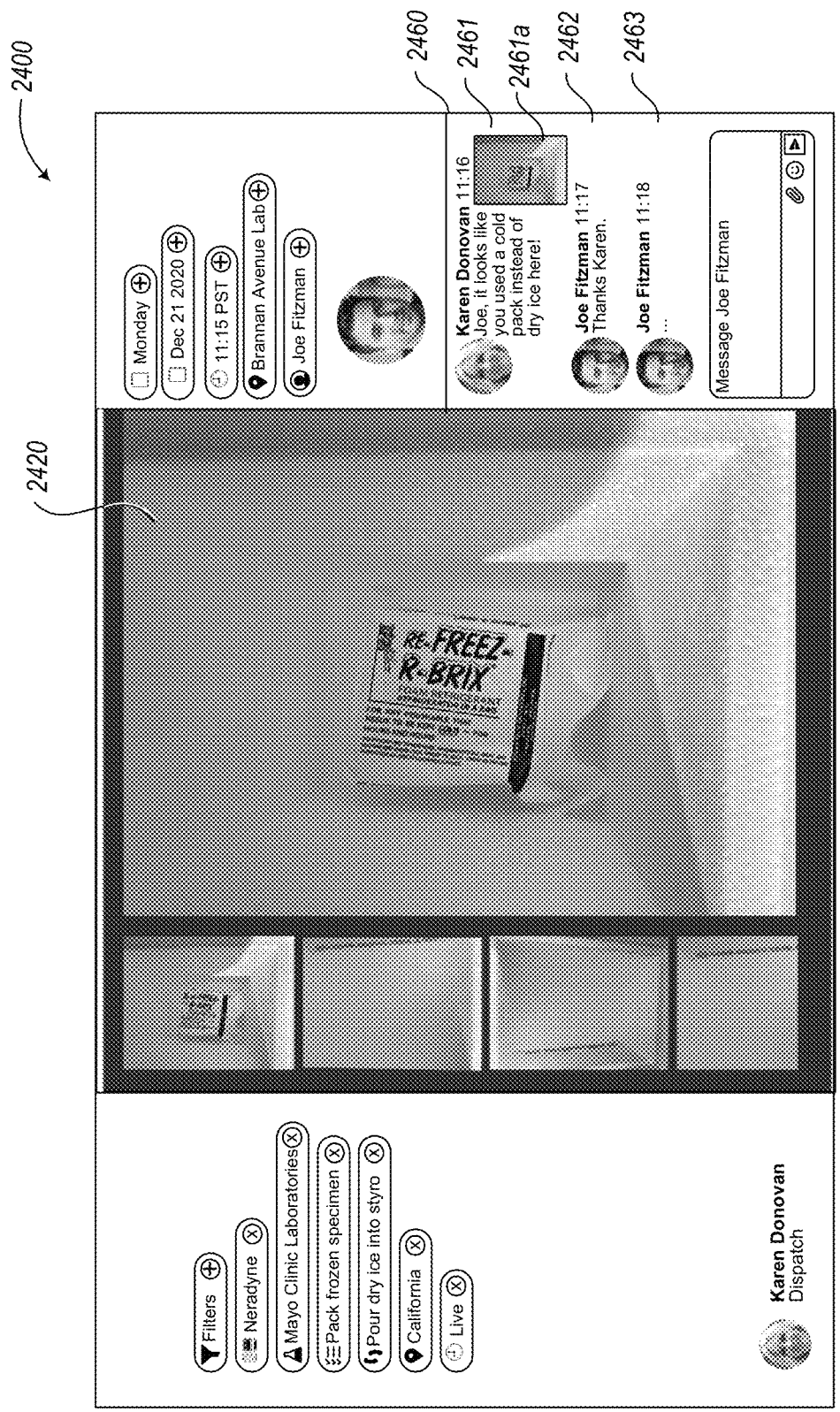
FIG. 24 is a display diagram showing sample contents of the reviewer user interface at a third time.

FIG. 24 is a display diagram showing sample contents of the reviewer user interface at a third time. By comparing the user interface display 2400 to user interface display 2300 shown in FIG. 23, it can be seen that a message exchange window 2460 between the reviewer and the agent is now displayed. The reviewer has sent a first message 2461 by typing its text in field 2350 and activing control 2354. The reviewer attached image 2461a to this first message by activating attach control 2352 and selecting photo 2420 for attachment. The courier reviewed message 2461 from the reviewer, and responded with message 2462. There is also an indication 2463 that the courier is in the process of sending a further response.

Figure 25:
FIG. 25 is a display diagram showing sample contents of the reviewer user interface at a fourth time.

FIG. 25 is a display diagram showing sample contents of the reviewer user interface at a fourth time. It can be seen that the courier agent has now sent a further response 2563, attaching a newly uploaded image 2520 as image 2563a showing that he has replaced a cold pack with dry ice in the bottom of the box, in accordance with the protocol.

Figure 26:
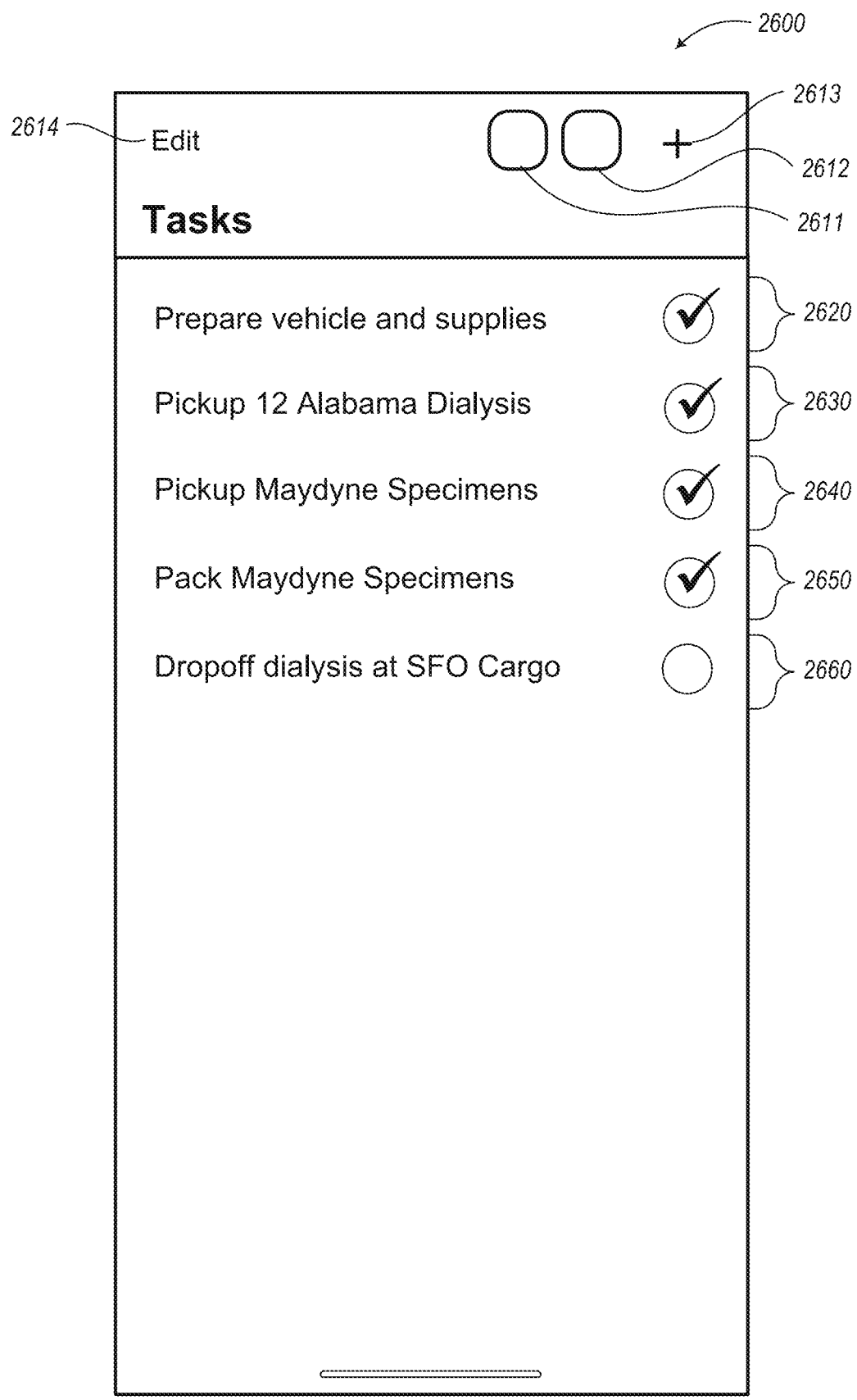
FIG. 26 is a display diagram showing sample contents of a display presented by the facility in some embodiments to show a further updated version of the courier agent's task list.

FIG. 26 is a display diagram showing sample contents of a display presented by the facility in some embodiments to show a further updated version of the courier agent's task list. In display 2600 it can be seen that the agent has completed tasks 2620, 2630, 2640, 2650, and that only task 2660 remains.

Returning to FIG. 14, in act 1406, if the current task is complete, then the facility continues in act 1407, else the facility continues in act 1404 to continue to guide the agent through the protocol for the current task. In act 1407, if additional tasks remain on the agent's schedule to be performed, then the facility continues in act 1402 to proceed to the next task, else this process concludes.

Figure 27:
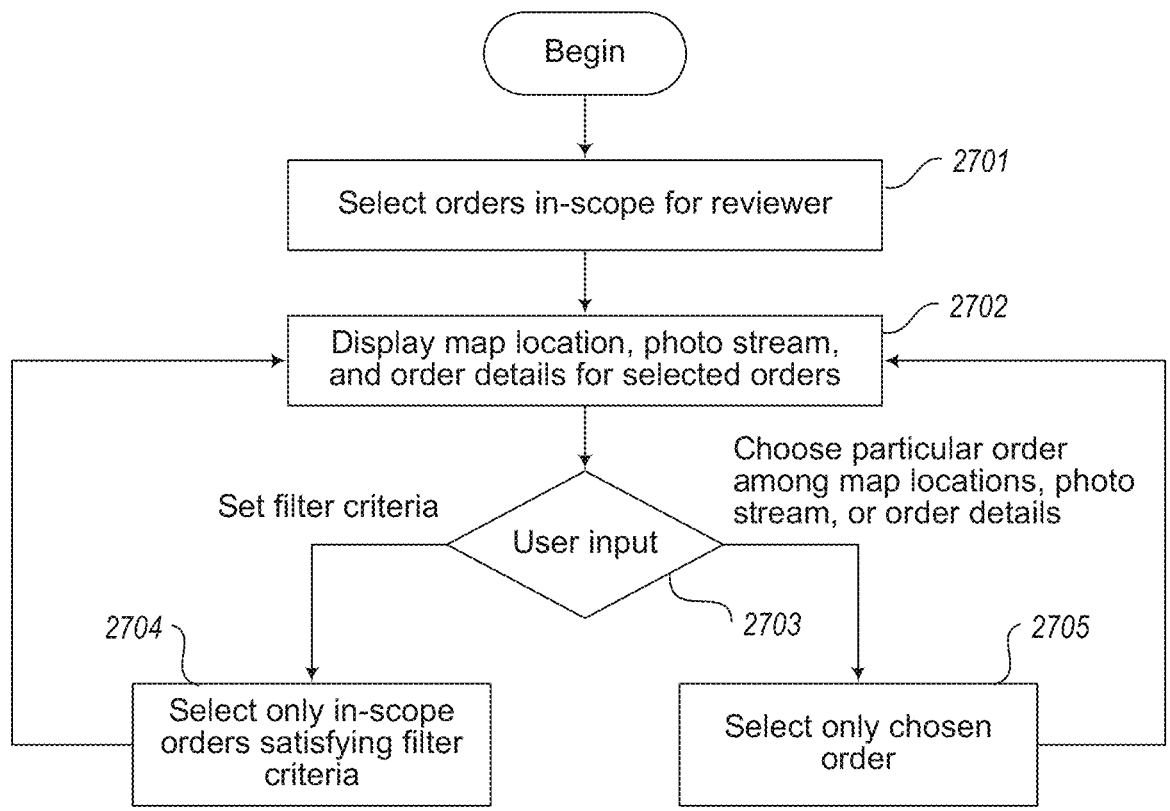
FIG. 27 is a flow diagram showing a process performed by the facility in some embodiments to enable a reviewer to navigate among the orders accessible to the reviewer.

FIG. 27 is a flow diagram showing a process performed by the facility in some embodiments to enable a reviewer to navigate among the orders accessible to the reviewer. In act 2701, the facility selects orders that are in-scope for the reviewer. In some embodiments, act 2701 includes selecting the orders that the reviewer has permission to access. In some embodiments, act 2701 involves various other forms of filtering, including, for example, filtering out orders more than a certain period of time ago, such as one month or one year. In act 2702, the facility displays the following information for the orders that are presently selected: a location for the order on a map, a photo stream or stream of other compliance evidence for the order, and order details. FIGS. 28-31 show aspects of the reviewer user interface that are the subject of the process shown in FIG. 27 and check that, with respect to particular example orders.

In act 2703, after performing the display of act 2702, the facility receives user input from a reviewer: if the received user input is to set filter criteria, then the facility continues in act 2704, while if the user input is to choose a particular courier order from among those shown as map locations, photo streams, or order details, then the facility continues in act 2705. In act 2704, where the user input sets filter criteria, the facility selects only those orders in scope for the reviewer that satisfy those filter criteria. After act 2704, the facility continues in act 2702 to redisplay the map locations, photo stream, and order details in accordance with the selection of act 2704.

Figure 28:
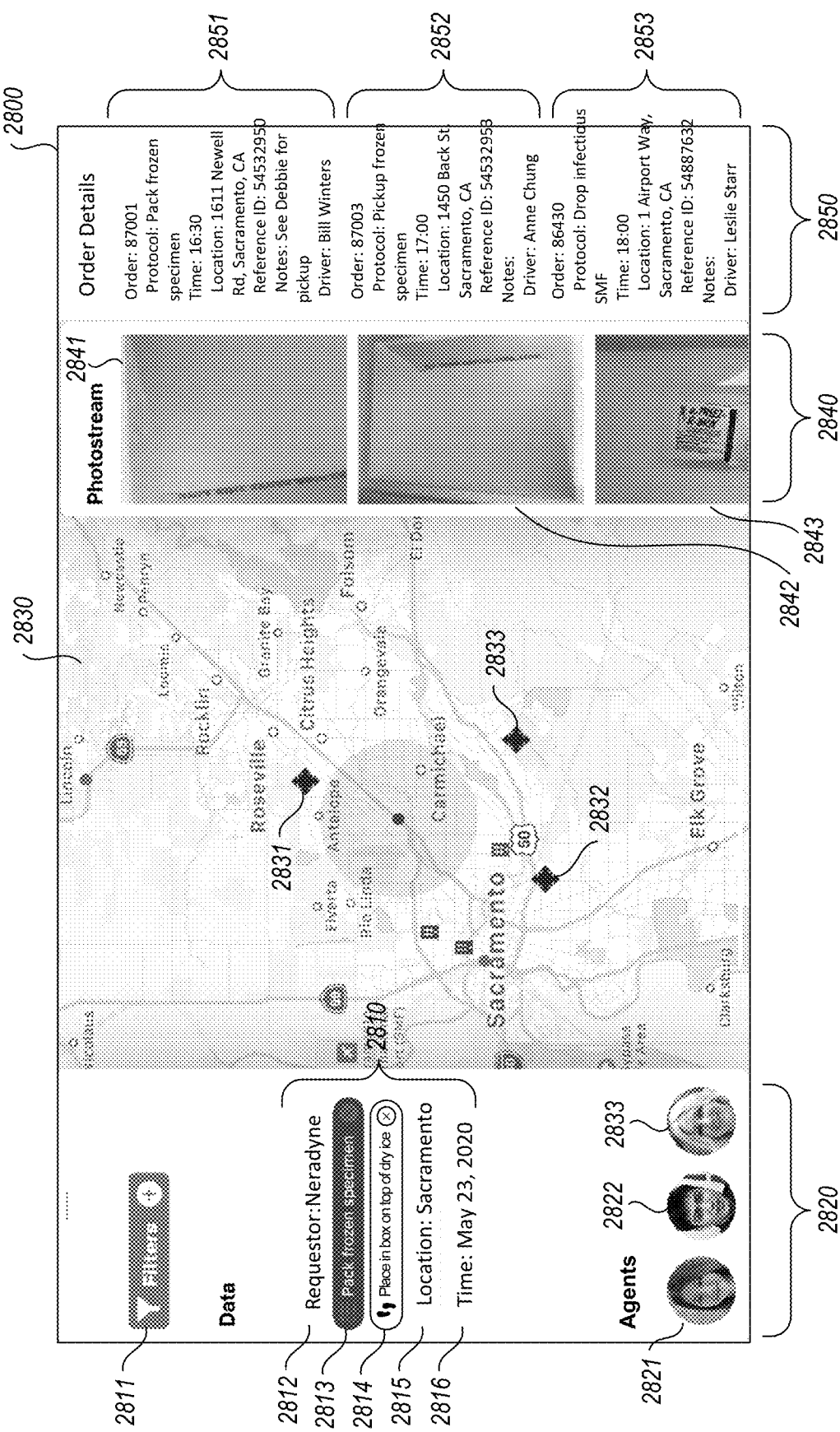
FIG. 28 is a display diagram showing sample contents of a reviewer order navigation reviewer user interface presented by the facility in some embodiments at a first time.

FIG. 28 is a display diagram showing sample contents of a reviewer order navigation reviewer user interface presented by the facility in some embodiments at a first time. Display 2800 shows that the reviewer has set filter criteria 2810 as follows: filter 2812 specifies that the customer is Naradyne; filter 2813 specifies that the protocol is pack frozen specimen; criterion 2814 specifies that the step of the protocol is place in box on top of dry ice; criterion 2815 specifies that the location is anywhere in Sacramento, California; and criterion 2816 specifies that the time is any time on May 23, 2020. The reviewer specified these filters using control 2811. In response to the reviewer setting these filter criteria, the facility has adjusted the locations displayed on the map, the photos displayed on the photo stream, and the order details to reflect only those orders in scope for the reviewer that satisfy the filter criteria. Map 2830 shows three location indications 2831-2833, each corresponding to one of three orders in scope for the reviewer that satisfy the filter criteria. The photo stream 2840 includes only those photos received for the three selected orders, and order details column 2850 contains only order details for these three selected orders. Additionally, an agents section 2820 contains only the photos 2821-2833 of the agents to which the selected orders are assigned.

Returning to FIG. 27, in act 2705, where user input is received from the reviewer that chooses a particular order from among the presently selected orders shown by their map locations, photo streams, or order details, the facility selects only the order chosen by this user input. After act 2705, the facility continues in act 2702 to display only the map location, photo stream, and order details of the single order selected in act 2705.

Figure 29:
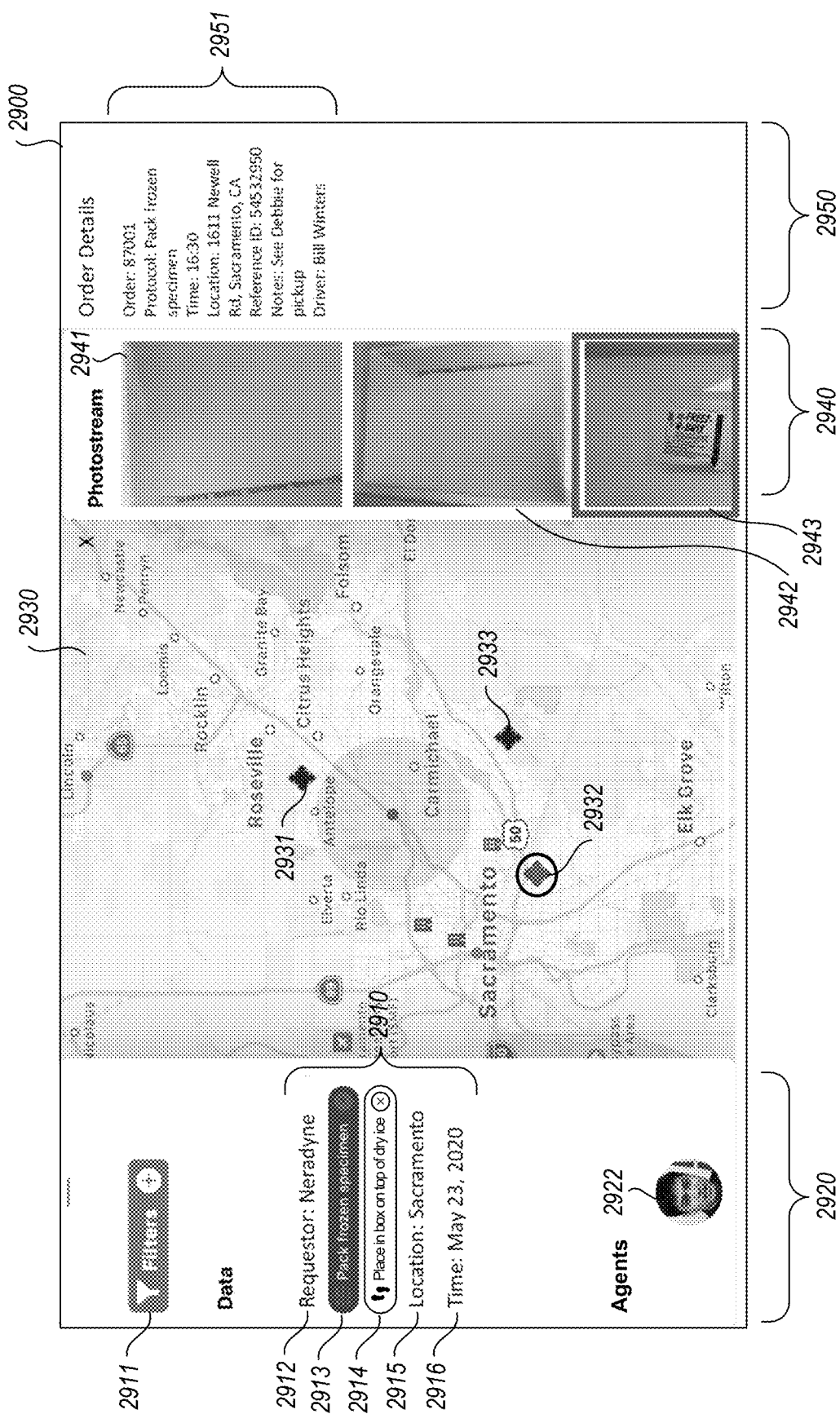
FIG. 29 is a display diagram showing the result of the reviewer selecting one of the photos in the photo stream for the three orders shown in FIG. 28.

FIG. 29 is a display diagram showing the result of the reviewer selecting one of the photos in the photo stream for the three orders shown in FIG. 28. In particular, by comparing display 2900 to display 2800 shown in FIG. 28, it can be seen by the box around photo 2943 that the reviewer has selected photo 2943 from the photo stream 2940, causing the facility to select only the order corresponding to this photo. In response, the facility has displayed a circle around geographic location indication 2932, and subsetted the list 2950 of order details to order details 2951, corresponding to the same order. Additionally, in drivers section 2920, the facility has subsetted the photos of drivers shown to include only photo 2922 for the driver.

Figure 30:
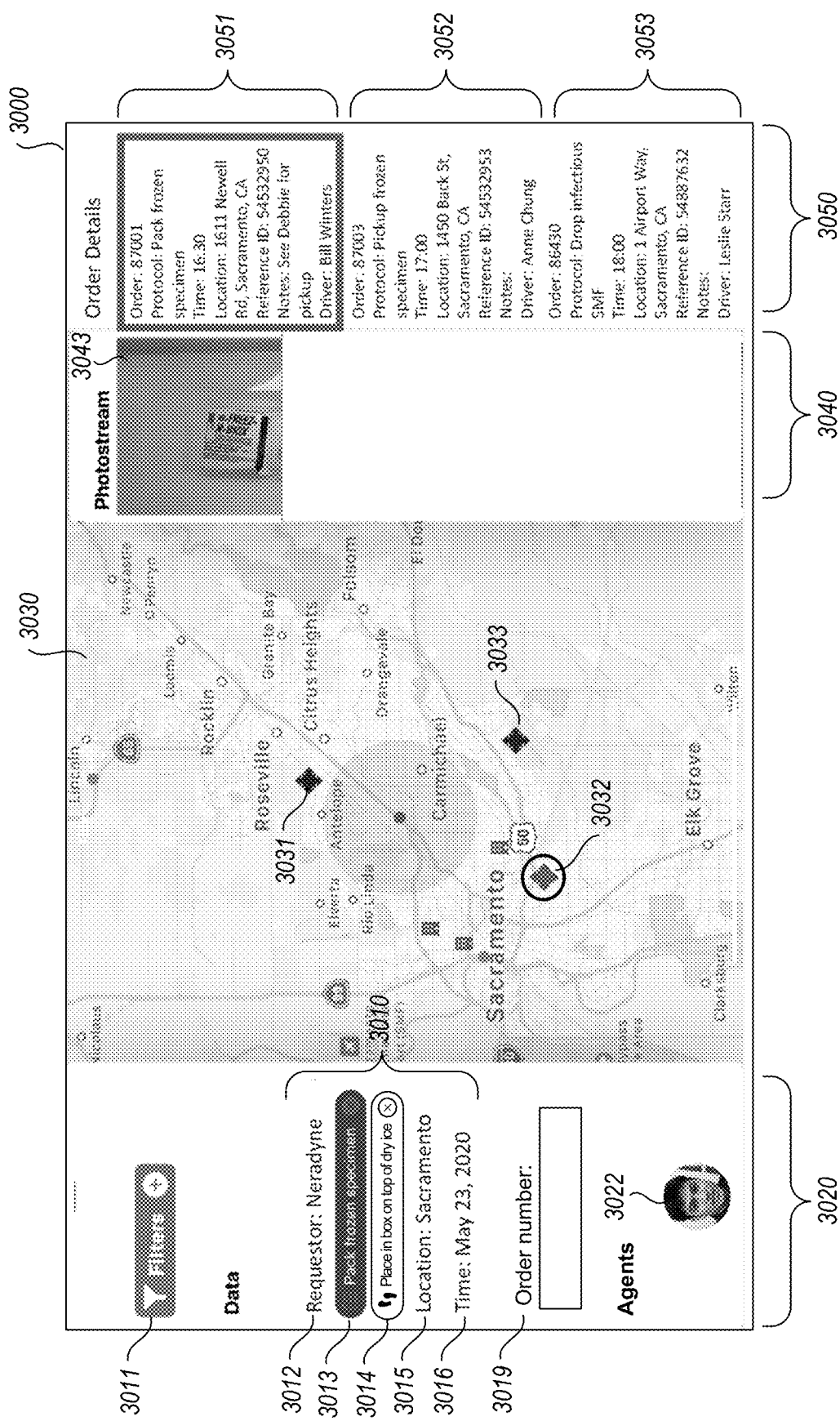
FIG. 30 is a display diagram showing the results in the reviewer order navigation user interface of the reviewer selecting the order details for a particular order.

FIG. 30 is a display diagram showing the results in the reviewer order navigation user interface of the reviewer selecting the order details for a particular order. By comparing display 3000 shown in FIG. 32 to display 2800 shown in FIG. 28, it can be seen by the box around order details 3051 that the reviewer has selected order details 3051 for a particular order. In response, the facility has filtered the photo shown in photo stream 3040 to only photo 3043 which corresponds to the selected order. Additionally, as shown in FIG. 29, the facility has circled geographic location 3032 on map 3030, which corresponds to the selected order, and shown only photo 3022 of the agent assigned to this order.

Figure 31:
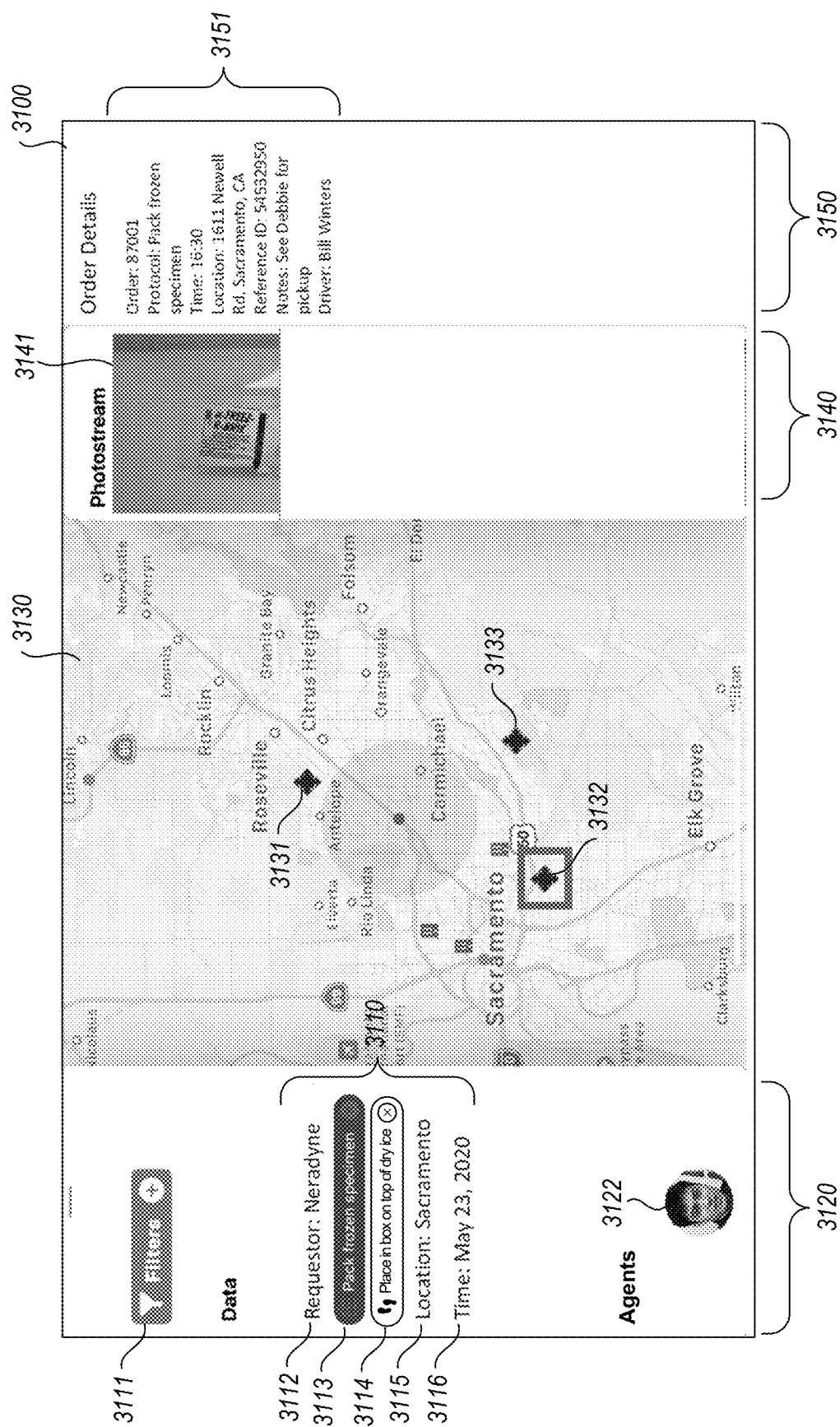
FIG. 31 is a display diagram showing the reviewer order navigation user interface after selection of a particular geographic location.

FIG. 31 is a display diagram showing the reviewer order navigation user interface after selection of a particular geographic location. By comparing display 3100 shown in FIG. 31 to display 2800 shown in FIG. 28, it can be seen by the box around geographic location 3132 that the reviewer has selected geographic location 3132 on map 3130, thus selecting the corresponding order. In response, the agent list 3120, the photo stream 3140, and the order details column 3150 are also set to show only contents related to this selected order.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more instances of computer-readable media collectively having contents adapted to cause a computing system to perform a method, the method comprising:
   displaying a list of courier service protocols, each having a name and specifying a sequence of courier service steps;
   receiving first user input selecting a displayed courier service protocol;
   receiving second user input specifying that the selected courier service protocol be cloned;
   in response to receiving the second user input, creating a courier service protocol cloned from the selected courier service protocol;
   receiving third user input specifying a name for the created courier service protocol;
   receiving fourth user input specifying an alteration to the sequence of courier service steps of the created courier service protocol;
   in response to receiving the fourth user input, altering the sequence of courier service steps of the created courier service protocol in accordance with the fourth user input; and
   in response to receiving the third and fourth user input, storing the altered created courier service protocol in connection with the specified name,
   such that any future courier service order can be based on the selected protocol or the altered protocol.

2. The one or more instances of computer-readable media of claim 1, the method further comprising:
   displaying a list of courier service protocols that includes the altered created courier service protocol.

3. The one or more instances of computer-readable media of claim 2, the method further comprising:
   receiving fifth user input identifying a drop-off location for a previously presented courier order;
   receiving sixth user input choosing a drop-off courier service protocol on the displayed list; and
   storing a previously presented courier order having the identified drop-off location and the chosen drop-off courier service protocol.

4. The one or more instances of computer-readable media of claim 3, the method further comprising:
   adding the previously presented courier order, including the identified drop-off location and the chosen drop-off courier service protocol, to a courier services schedule of a particular courier agent.

5. The one or more instances of computer-readable media of claim 3 wherein the fifth and sixth user input is received via a courier services ordering web page.

6. The one or more instances of computer-readable media of claim 3 wherein the fifth and sixth user input is received by a dispatch system.

7. The one or more instances of computer-readable media of claim 3, the method further comprising:
   receiving seventh user input identifying a pickup location for the previously presented courier order; and
   receiving eighth user input choosing a pickup courier service protocol on the displayed list,
   and wherein the stored previously presented courier order further has the identified pickup location and the chosen pickup courier service protocol.

8. The one or more instances of computer-readable media of claim 1 wherein the fourth user input specifies inserting a previously presented courier service step in the created courier service protocol's sequence of courier service steps.

9. The one or more instances of computer-readable media of claim 8 wherein the fourth user input comprises a media item showing an example of correct performance of the inserted step.

10. The one or more instances of computer-readable media of claim 8 wherein the fourth user input specifies identifies particular compliance evidence to be collected for the inserted step.

11. The one or more instances of computer-readable media of claim 1 wherein the fourth user input specifies deleting a courier service step from the created courier service protocol's sequence of courier service steps.

12. The one or more instances of computer-readable media of claim 1 wherein the fourth user input specifies altering a courier service step in the created courier service protocol's sequence of courier service steps.

13. The one or more instances of computer-readable media of claim 1 wherein the sequence of courier service steps of the stored courier service protocol includes two or more distinguished steps for which the stored courier service protocol specifies compliance evidence that is to be collected demonstrating compliance with the distinguished steps.

14. The one or more instances of computer-readable media of claim 1, the method further comprising:
   receiving fifth input from a customer requesting to create a courier service order;
   presenting to the customer a list of courier service protocols including the altered protocol;
   receiving sixth input from the customer selecting the altered protocol;
   receiving seventh input from the customer specifying order details; and
   creating a courier service order for the customer by populating a copy of the altered protocol in accordance with the order details.

15. A method in a computing system, comprising:
   displaying a list of courier service protocols, each having a name and specifying a sequence of courier service steps;
   receiving first user input selecting a displayed courier service protocol;

receiving second user input specifying that the selected courier service protocol be cloned;

in response to receiving the second user input, creating a courier service protocol cloned from the selected courier service protocol;

receiving third user input specifying a name for the created courier service protocol;

receiving fourth user input specifying an alteration to the sequence of courier service steps of the created courier service protocol;

in response to receiving the fourth user input, altering the sequence of courier service steps of the created courier service protocol in accordance with the fourth user input; and in response to receiving the third and fourth user input, storing the altered created courier service protocol in connection with the specified name, such that any future courier service order can be based on the selected protocol or the altered protocol.

16. The method of claim 15, further comprising:
receiving fifth user input identifying a drop-off location for a previously presented courier order;
displaying a list of courier service protocols that includes the altered created courier service protocol;
receiving sixth user input choosing a drop-off courier service protocol on the displayed list; and
storing a previously presented courier order having the identified drop-off location and the chosen drop-off courier service protocol.

17. The method of claim 16, further comprising:
adding the previously presented courier order, including the identified drop-off location and the chosen drop-off courier service protocol, to a courier services schedule of a particular courier agent.

18. The method of claim 16 wherein the fourth user input specifies inserting a previously presented courier service step in the created courier service protocol's sequence of courier service steps.

19. The method of claim 18 wherein the fourth user input comprises a media item showing an example of correct performance of the inserted step.

20. The method of claim 18 wherein the fourth user input specifies identifies particular compliance evidence to be collected for the inserted step.

21. The method of claim 15 wherein the sequence of courier service steps of the stored courier service protocol includes two or more distinguished steps for which the stored courier service protocol specifies compliance evidence that is to be collected demonstrating compliance with the distinguished steps.

22. The method of claim 15, further comprising:
receiving fifth input from a customer requesting to create a courier service order;
presenting to the customer a list of courier service protocols including the altered protocol;
receiving sixth input from the customer selecting the altered protocol;
receiving seventh input from the customer specifying order details; and
creating a courier service order for the customer by populating a copy of the altered protocol in accordance with the order details.

* * * * *